(12) United States Patent
Chang

(10) Patent No.: US 10,717,205 B1
(45) Date of Patent: Jul. 21, 2020

(54) SLIDE MECHANISM AND RIP FENCE OF TABLE SAW

(71) Applicant: Chin-Chin Chang, Taichung (TW)

(72) Inventor: Chin-Chin Chang, Taichung (TW)

(*) Notice: Subject to any disclaimer, the term of this patent is extended or adjusted under 35 U.S.C. 154(b) by 0 days.

(21) Appl. No.: 16/298,417

(22) Filed: Mar. 11, 2019

(51) Int. Cl.
*B27B 27/02* (2006.01)
*B27B 27/10* (2006.01)
*B23D 47/02* (2006.01)

(52) U.S. Cl.
CPC ............ *B27B 27/10* (2013.01); *B23D 47/025* (2013.01); *B27B 27/02* (2013.01)

(58) Field of Classification Search
CPC  B27B 5/16; B27B 5/181; B27B 27/00; B27B 27/02; B27B 27/08; B27B 27/10; B23D 45/06; B26D 7/01
See application file for complete search history.

(56) References Cited

U.S. PATENT DOCUMENTS

| | | | |
|---|---|---|---|
| 5,619,896 A * | 4/1997 | Chen | B23D 47/025 |
| | | | 144/286.1 |
| 6,450,077 B1 * | 9/2002 | Ceroll | B23Q 3/007 |
| | | | 144/287 |
| 2011/0197733 A1 * | 8/2011 | Liu | B27B 27/02 |
| | | | 83/444 |
| 2015/0059546 A1 * | 3/2015 | Chang | B27B 27/10 |
| | | | 83/438 |
| 2015/0107429 A1 * | 4/2015 | Ceroll | B27B 27/10 |
| | | | 83/468.7 |
| 2018/0257254 A1 * | 9/2018 | Chang | B27B 27/10 |
| 2019/0105797 A1 * | 4/2019 | Chang | B27B 27/10 |

* cited by examiner

*Primary Examiner* — Stephen Choi

(57) ABSTRACT

A table saw includes a slide mechanism on a table assembly and including a knob, front and rear roller pinions, two slides slidably secured to front and rear ends of the table respectively, each slide having a bottom rack engaging the roller pinion, a groove on an outer surface, and projections projecting out of the groove, front and rear mounting members secured to the table, and an axle; and a rip fence assembly on either side of the table assembly and including front and rear arms each having a cavity for releasably securing to one projection, a rip fence between the arms, front and rear risers respectively for fastening either end of the rip fence and either one of the front and rear arms, and two levers on the arms respectively, each lever including an upper pivot, an intermediate urging protuberance, and a lower protrusion.

1 Claim, 33 Drawing Sheets

SLIDE MECHANISM AND RIP FENCE OF TABLE SAW

BACKGROUND OF THE INVENTION

1. Field of the Invention

The invention relates to table saws and more particularly to a rack and roller pinion driven slide mechanism having improved characteristics and a rip fence also having improved characteristics.

2. Description of Related Art

U.S. Pat. No. 9,095,989 to Chang, entitled "rip fence with locking mechanisms", discloses a table saw including a movable rip fence and a base including an upper cutting surface through which a blade extends. The rip fence includes front and rear clamping mechanisms connected to front and rear ends of a casing respectively. The front clamping mechanism includes a frame, a lever pivotably secured to the frame to be pivotal between a locked position and a released position, the lever having an internal cam member, a clamping member pivotably secured to the lever, the clamping member having a hook at an open end, a spring biased shaft, and a C-clip for retaining an inner end of the shaft in the frame. A pivotal movement of both the lever and the clamping member causes the cam member to push the shaft inward until the shaft is pushed outward to urge against the cam member in the locked position.

U.S. Pat. No. 9,731,432 to Chang, entitled "rip fence with locking device", discloses a moveable rip fence of a table saw comprising a housing including an elongated top opening, a seat secured to an underside of top of the housing, the seat having a lower through hole, and a stop member across two sides of the housing, a lever pivotably fastened in the elongated opening; a link pivotably interconnecting the lever and a spring biased rod, an inverted L-shaped limit member secured across two sides of the housing; a clamping member having a top secured by a support member and including an intermediate hole member and a projecting base member; and a locking member including a lower wedge member fastened on the base member, and a flexible inclined member on a top. The lever is flush with the top of the housing in a locked position. A pressing of a rear portion of the lever unlocks the rip fence.

U.S. Pat. No. 10,183,415 to Chang, entitled "table saw", discloses a table saw comprising a table, a saw, a track, a slide strip, and a fence member. The table has an axial direction and a radial direction which are orthogonal to each other. The saw is arranged at a predetermined position of the table. The track is arranged at each side of the table. The slide strip is slidably engaged with the track. An outer surface of the slide strip opposite to the track has a first position part, a second position part, and a third position part. The first position part and the second position part are respectively arranged at two ends of the slide strip and the third position part is arranged at a center of the slide strip. The fence member is bridged on the table and secured to one of the first position part, the second position part, and the third position part.

While the table saws enjoy their success in the market, continuing improvements in the exploitation of table saw of this type are constantly being sought.

SUMMARY OF THE INVENTION

It is therefore one object of the invention to provide a table saw comprising a base assembly; a table assembly mounted on the base assembly and including a table; a slide mechanism mounted on the table assembly and including a knob, front and rear roller pinions adjacent to the knob, front and rear mounting members secured to a bottom of the table and being adjacent to the front and rear roller pinions, two slides slidably secured to front and rear ends of the table respectively, each slide having a bottom rack engaging either one of the front and rear roller pinions, and an axle mounted under the table and having two ends attached to the front and rear roller pinions respectively so that the axle is configured to rotatably pass through the front and rear mounting members; and a rip fence assembly mounted on either side of the table assembly and including a lengthwise groove on an outer surface, a plurality of projections projecting out of the groove, front and rear arms each having a cavity at an open end configured to releasably secure to one of the projections, a rip fence disposed between the arms, front and rear risers respectively for fastening either end of the rip fence and either one of the front and rear arms, and two levers disposed on the arms respectively, each lever being adjacent to the cavity and including a spring biased pivot at an upper end, an intermediate urging protuberance, and a lower protrusion.

The above and other objects, features and advantages of the invention will become apparent from the following detailed description taken with the accompanying drawings.

DETAILED DESCRIPTION OF THE INVENTION

Figure 1:
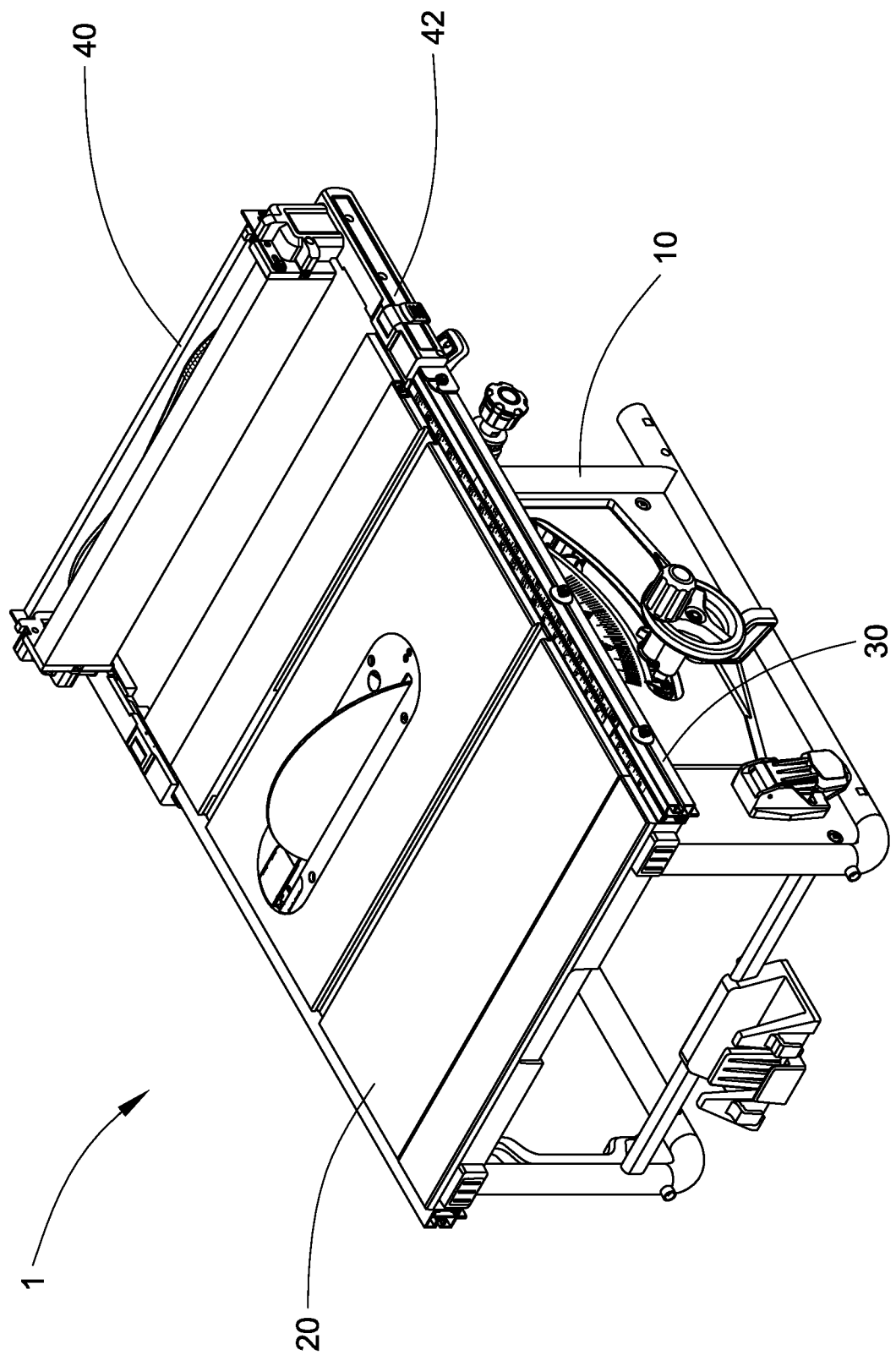
FIG. 1 is a perspective view of a table saw incorporating a slide mechanism and a rip fence according to the invention.
Figure 2:
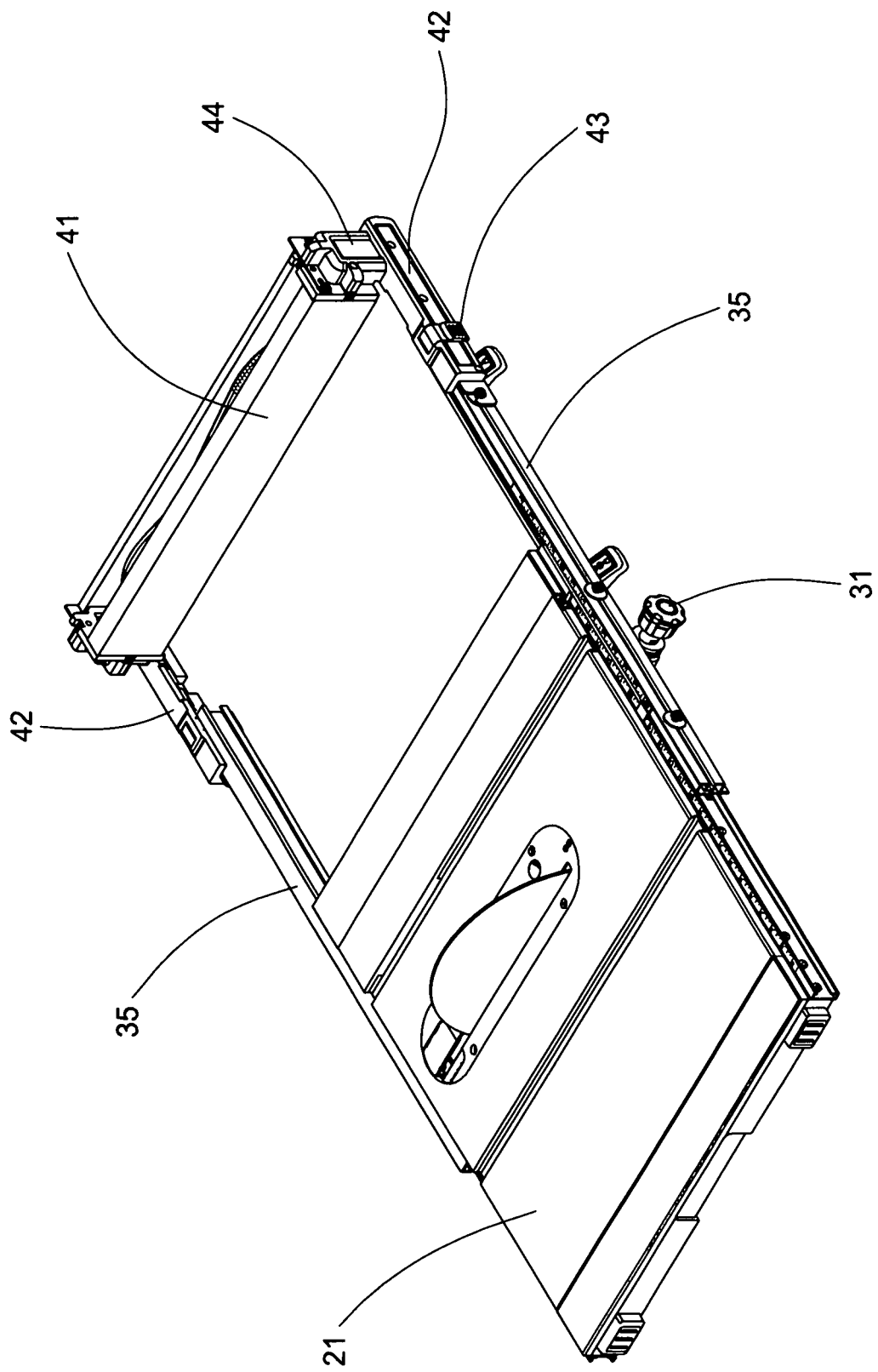
FIG. 2 is a perspective view of the table assembly, the rip fence assembly and the slide mechanism viewing from above.
Figure 3:
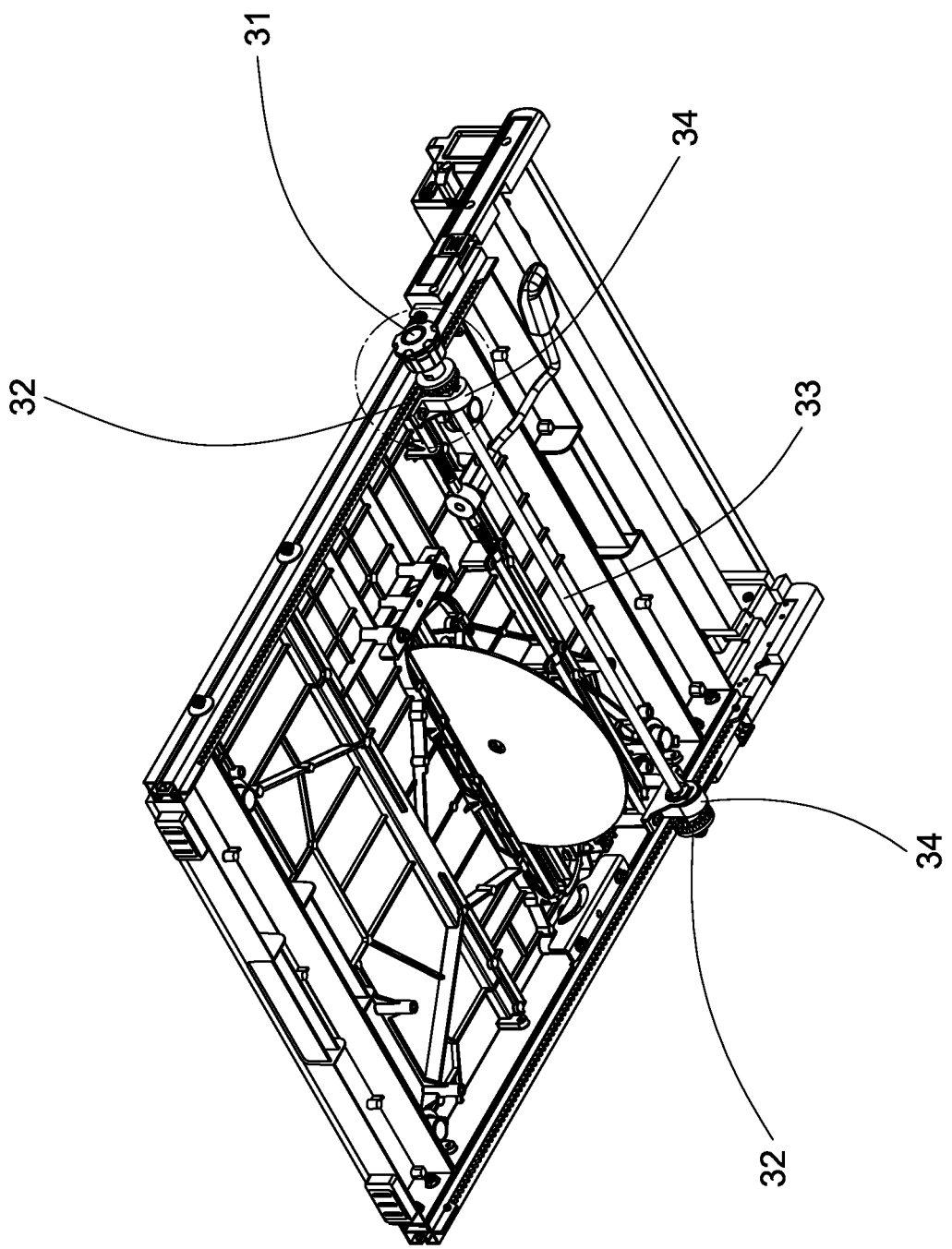
FIG. 3 is another perspective view of the table assembly, the rip fence assembly and the slide mechanism viewing from below.
Figure 4:
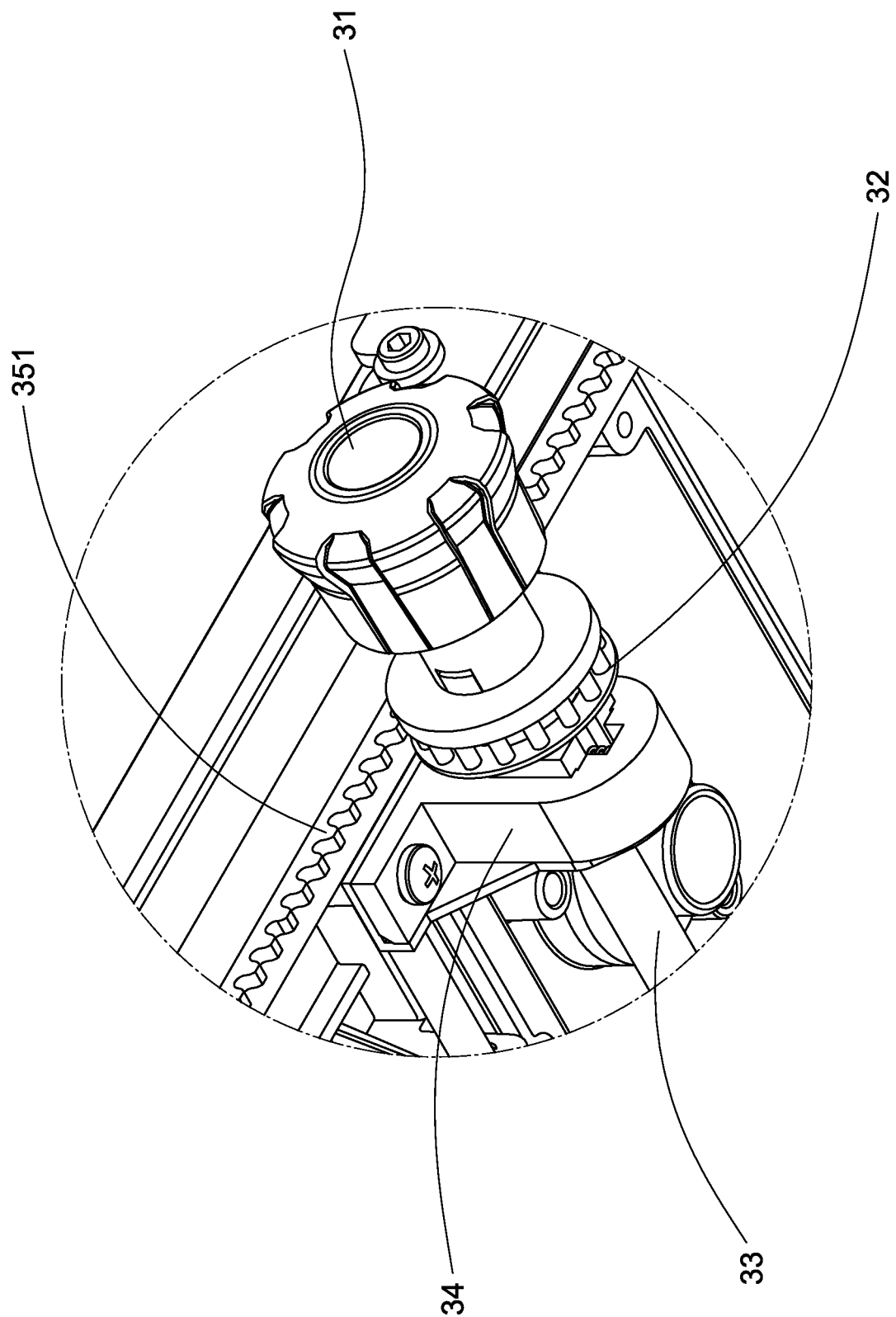
FIG. 4 is a detailed view of the area in a circle of FIG. 3.

Referring to FIGS. 1 to 22B, a table saw 1 in accordance with the invention comprises a base assembly 10, a table assembly 20 mounted on the base assembly 10, a slide mechanism 30 mounted on both the base assembly 10 and the table assembly 20, and a rip fence assembly 40 mounted on the right side of the table assembly 20 as discussed in detail below.

Figure 12:
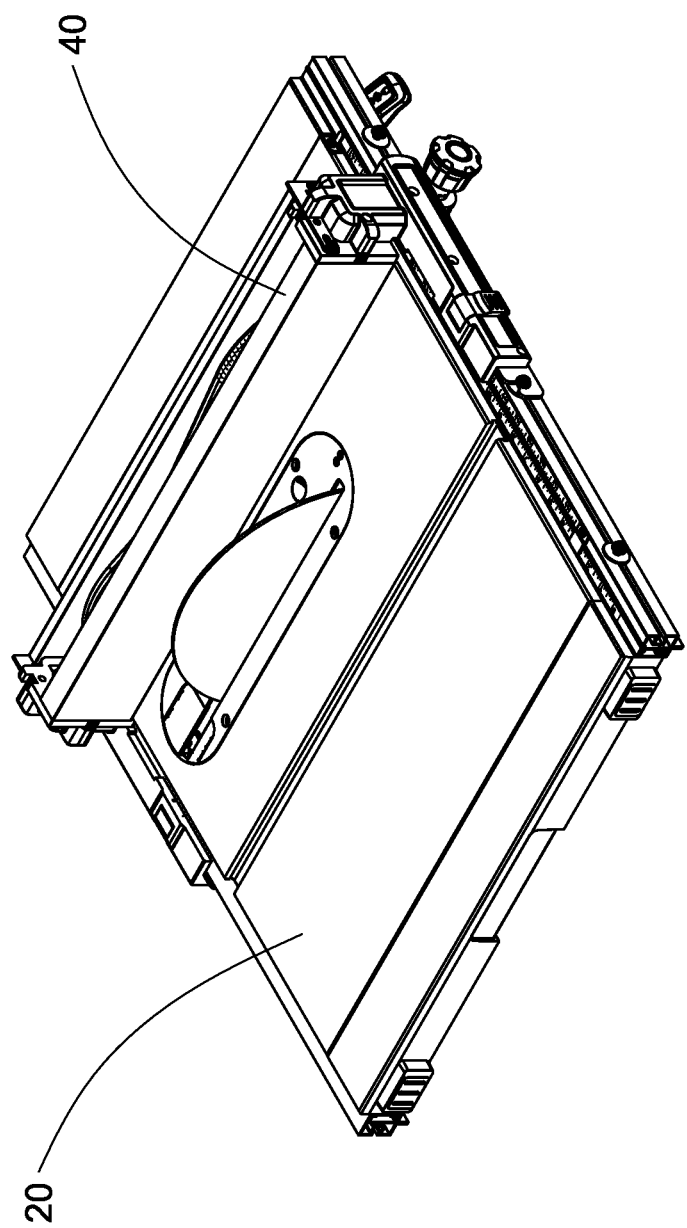
FIG. 12 is a view similar to FIG. 11 where the rip fence assembly is located at a short distance from the right side.
Figure 13:
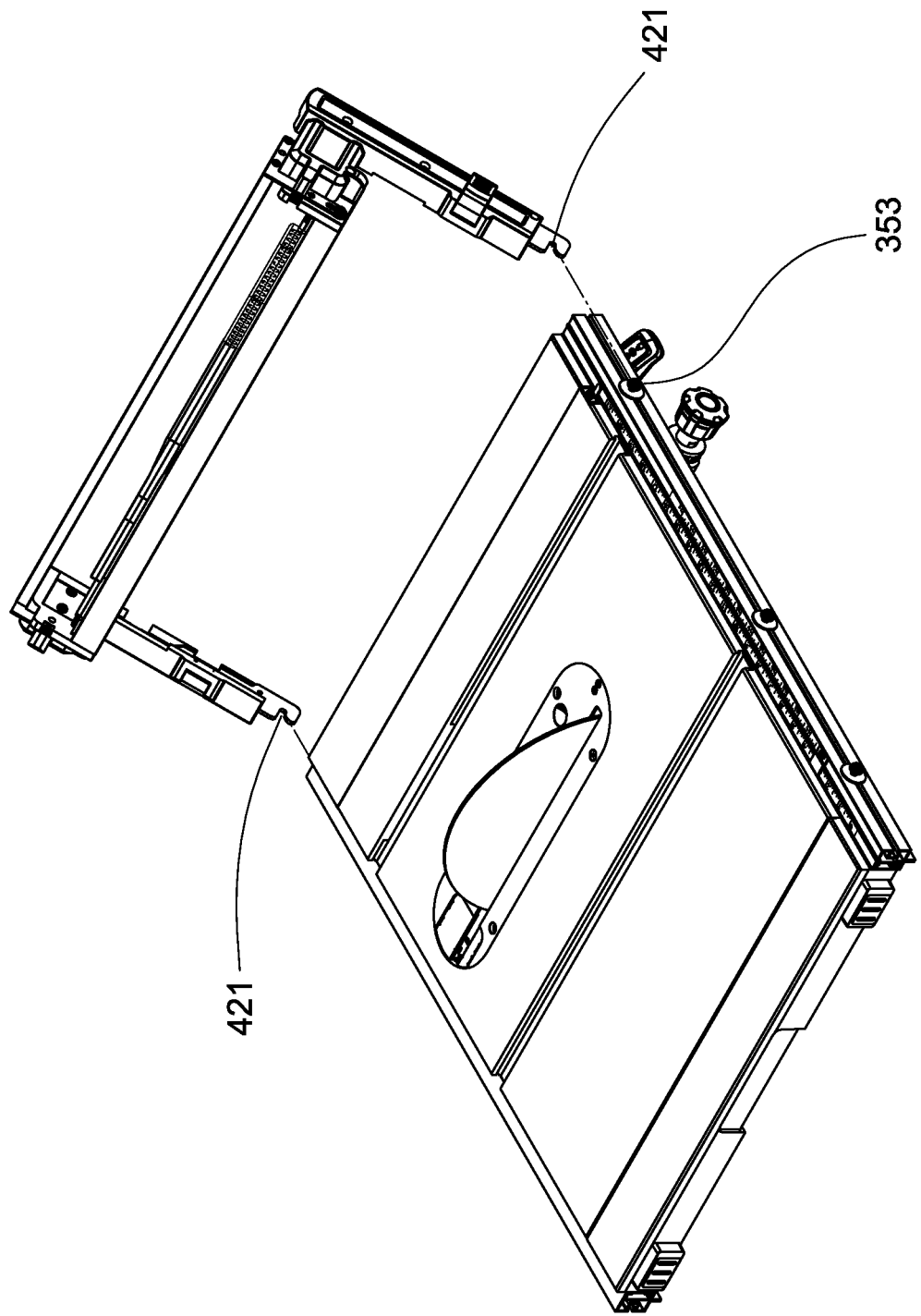
FIG. 13 is a perspective view showing the rip fence assembly to be assembled.
Figure 14A:
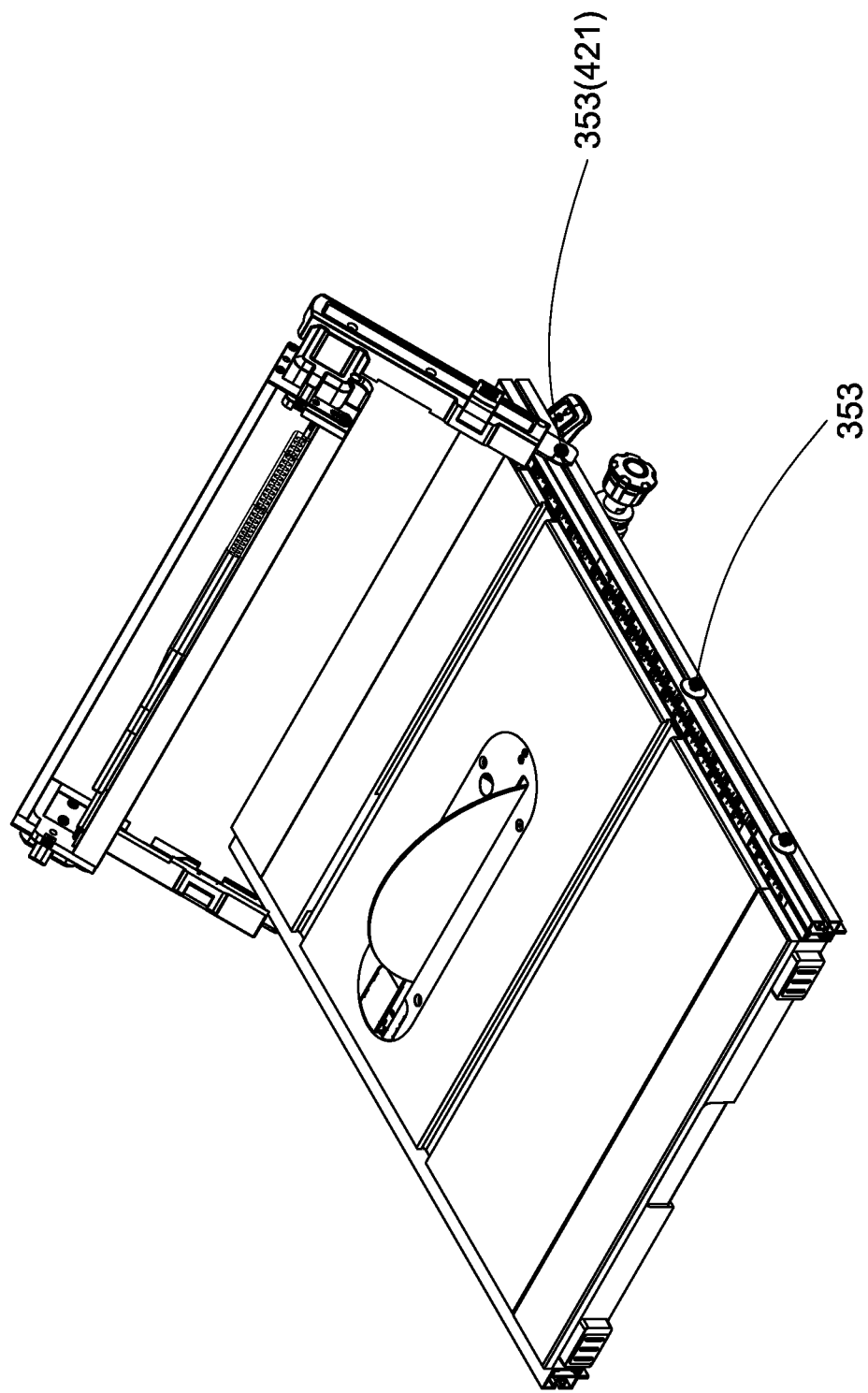
FIG. 14A is a view similar to FIG. 13 showing a further step for assembling the rip fence assembly.
Figure 14B:
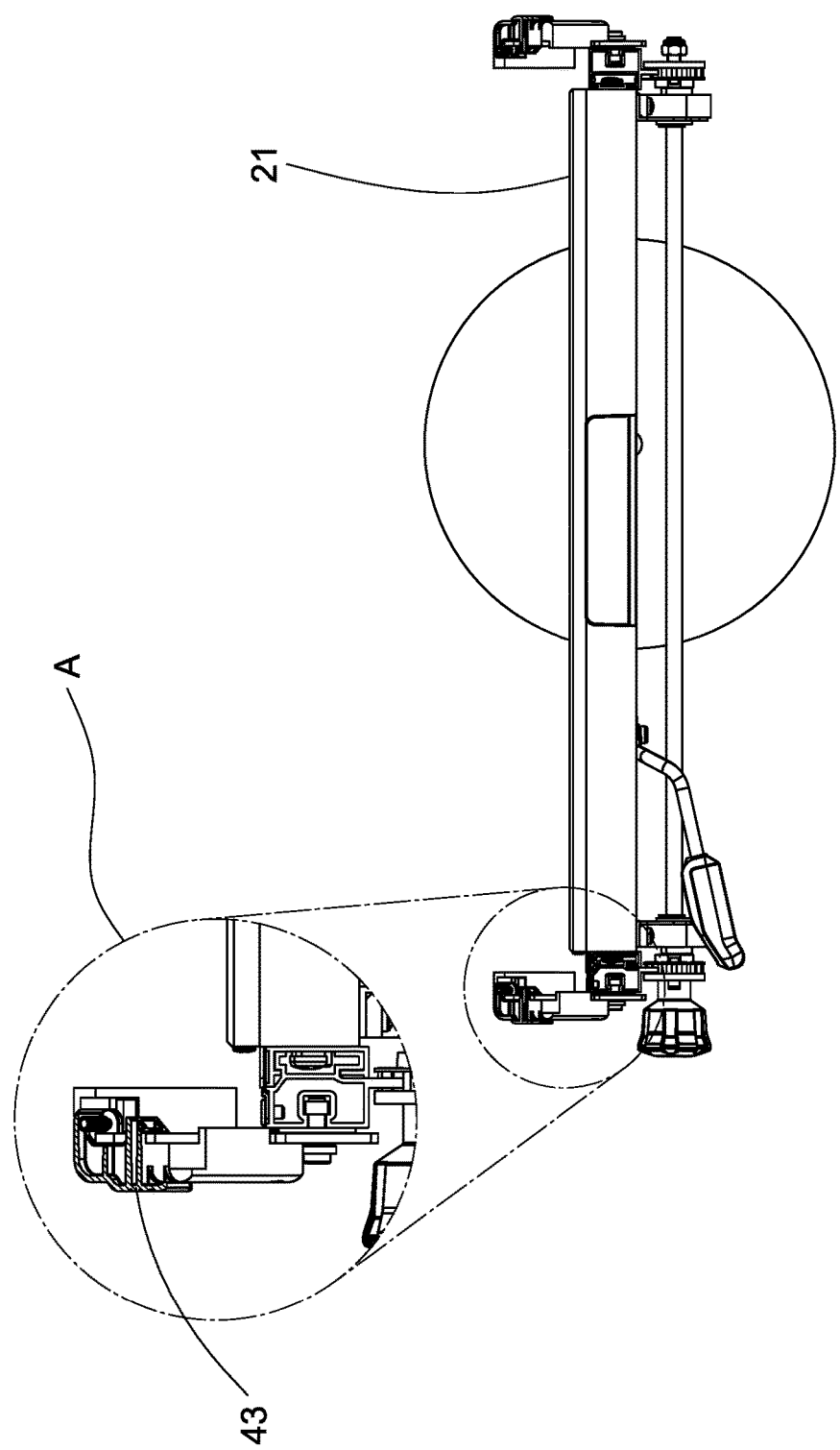
FIG. 14B is a left side view of the table assembly, the rip fence assembly and the slide mechanism in part section.
Figure 14C:
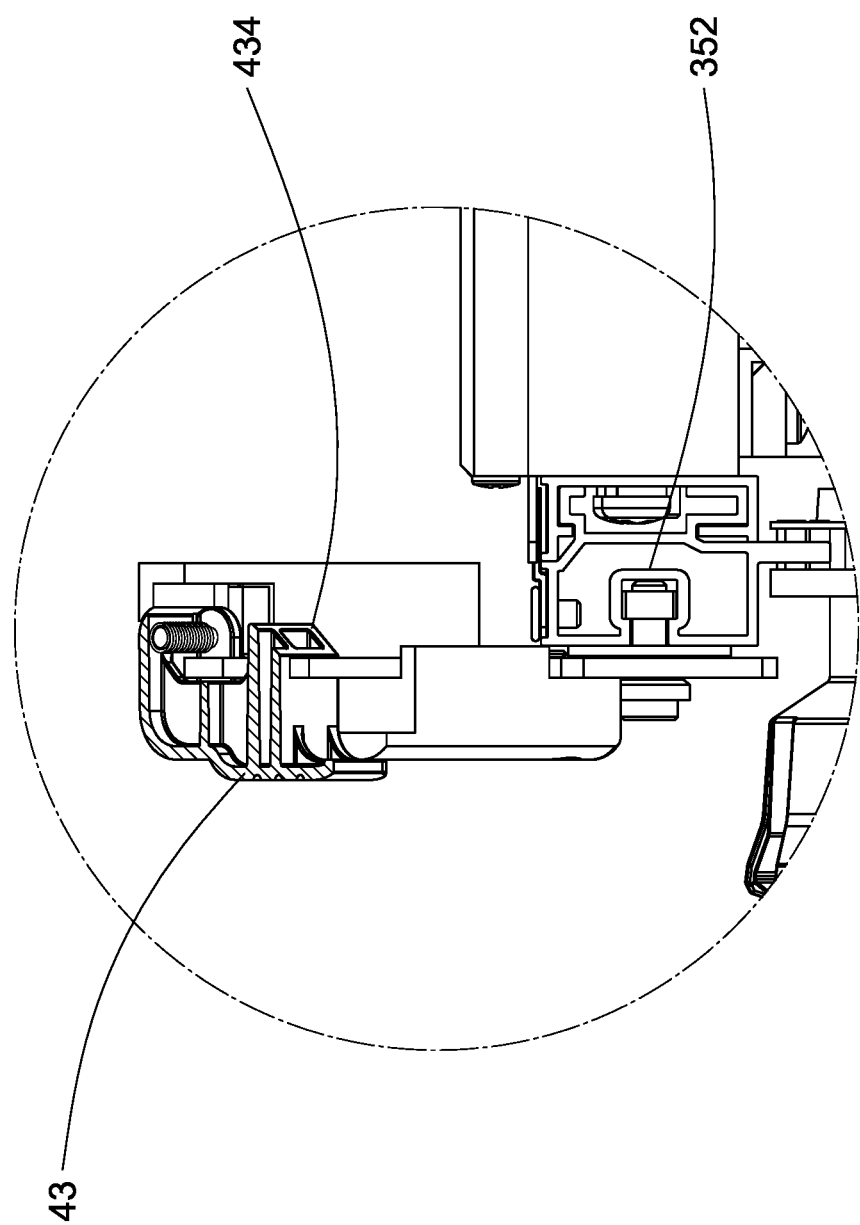
FIG. 14C is a detailed view of the area in a circle A of FIG. 14B.
Figure 15A:
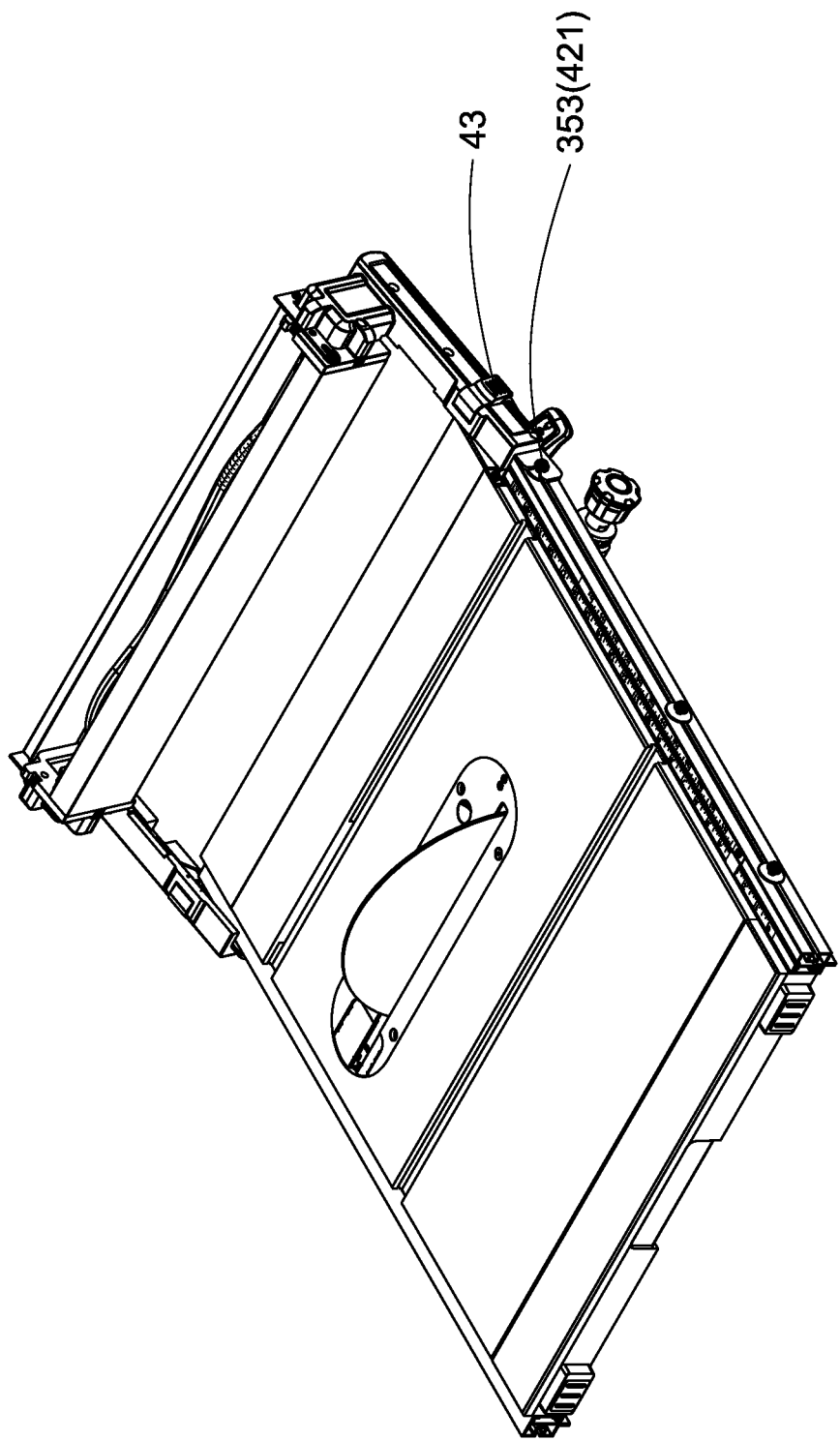
FIG. 15A is a view similar to FIG. 14A showing another further step for assembling the rip fence assembly.
Figure 15B:
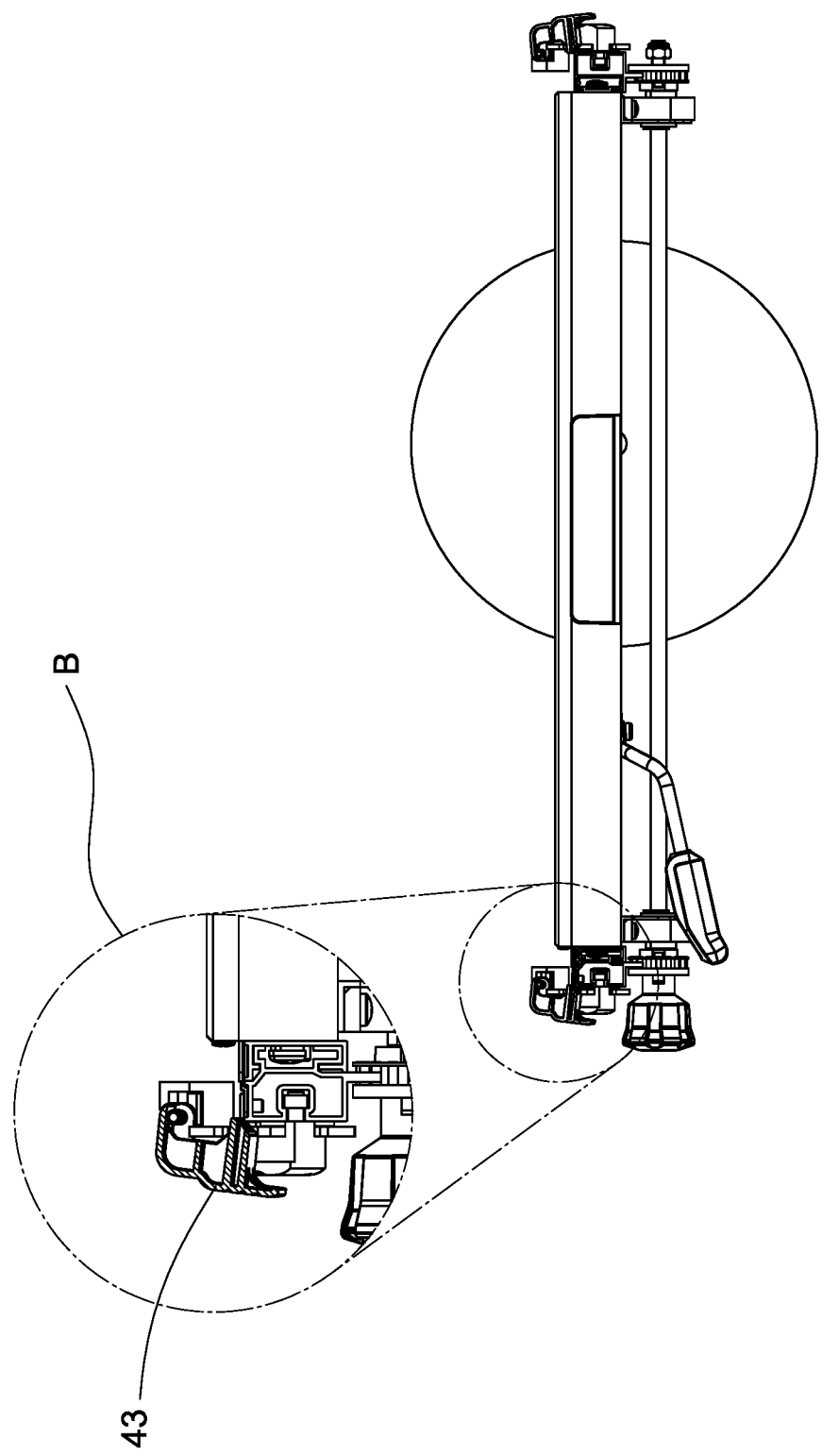
FIG. 15B is a view similar to FIG. 14B showing the rip fence assembly has been fastened.
Figure 15C:
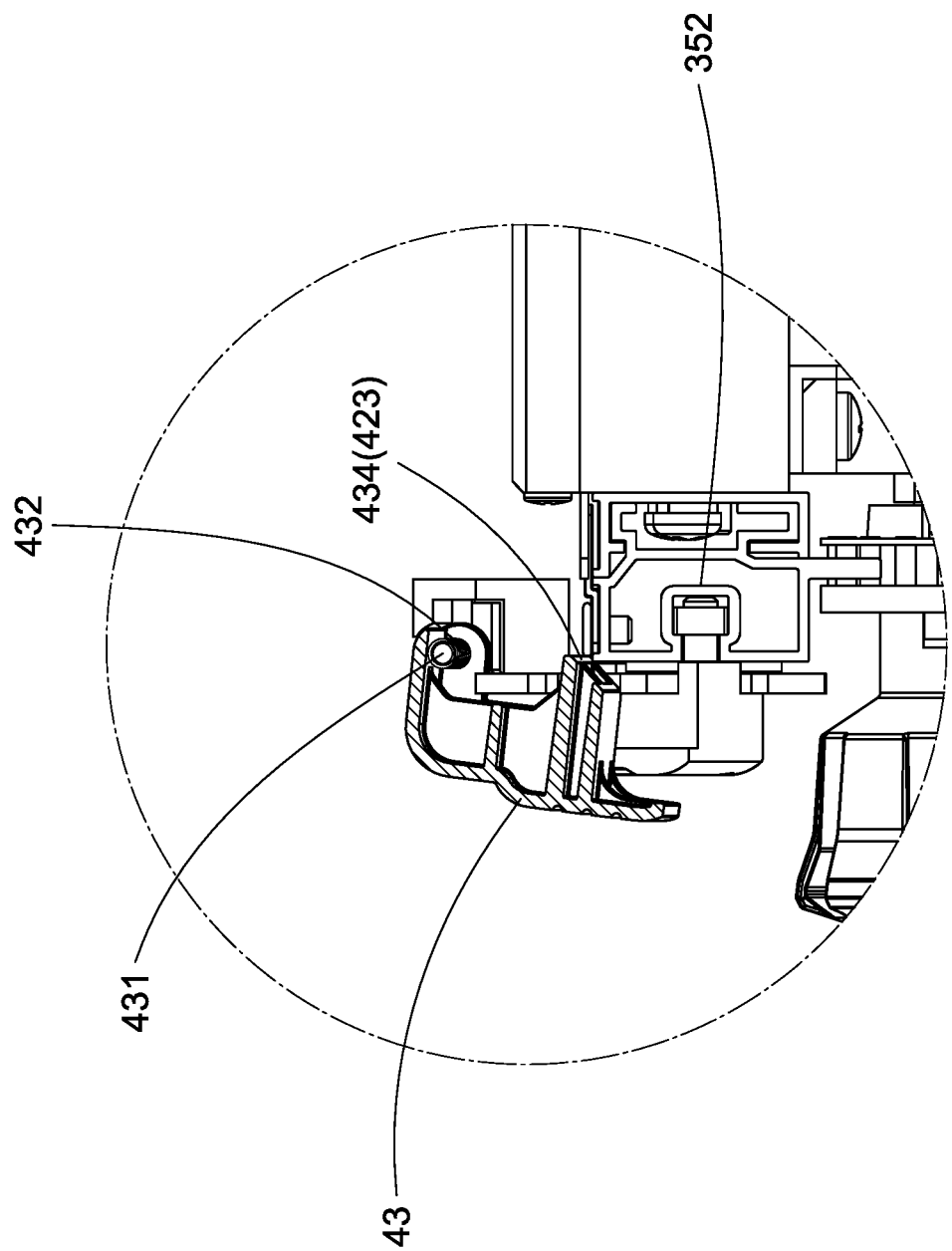
FIG. 15C is a detailed view of the area in a circle B of FIG. 15B.
Figure 16A:
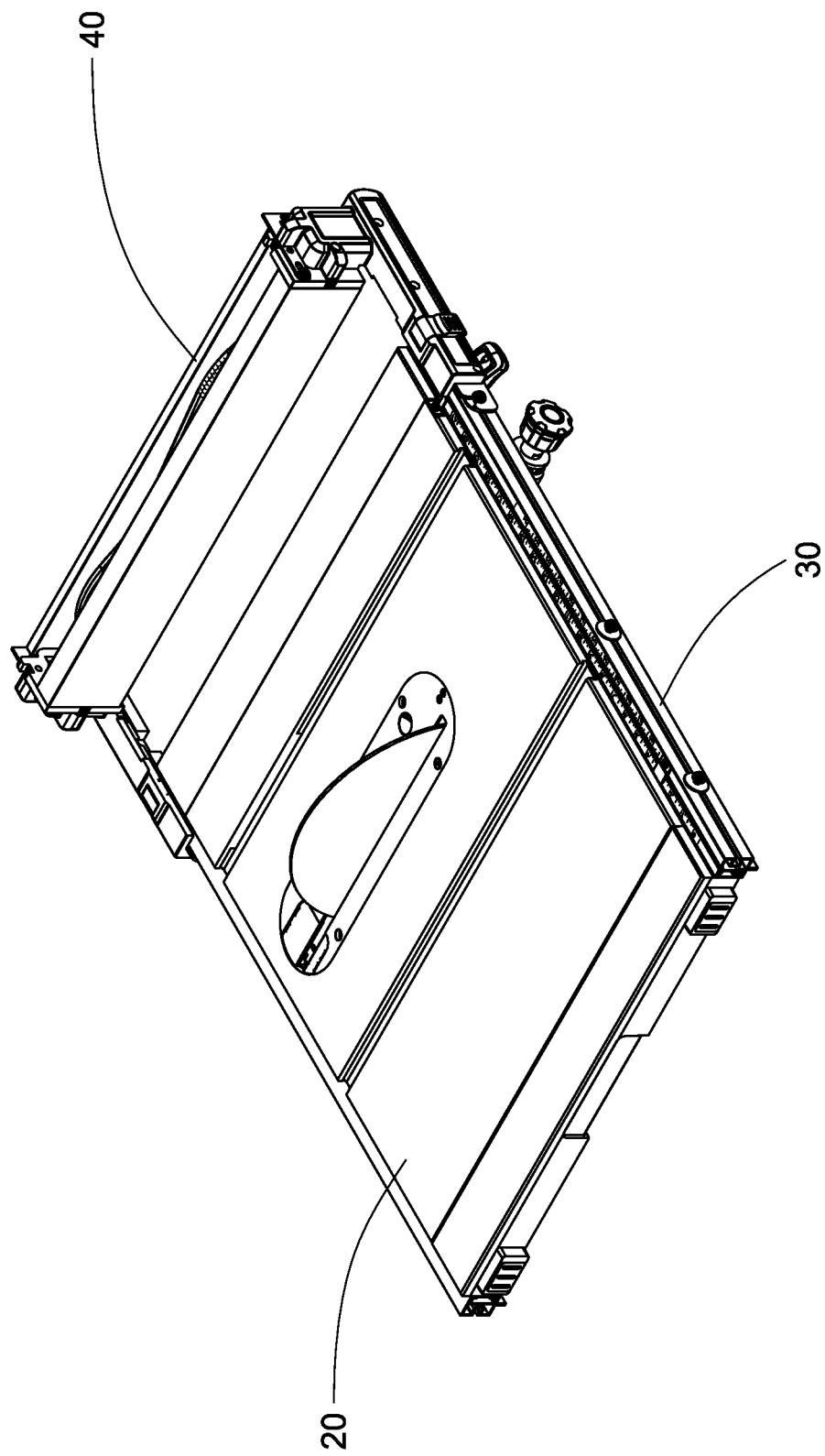
FIG. 16A is a perspective view of the table assembly, the rip fence assembly and the slide mechanism after being assembled.
Figure 16B:
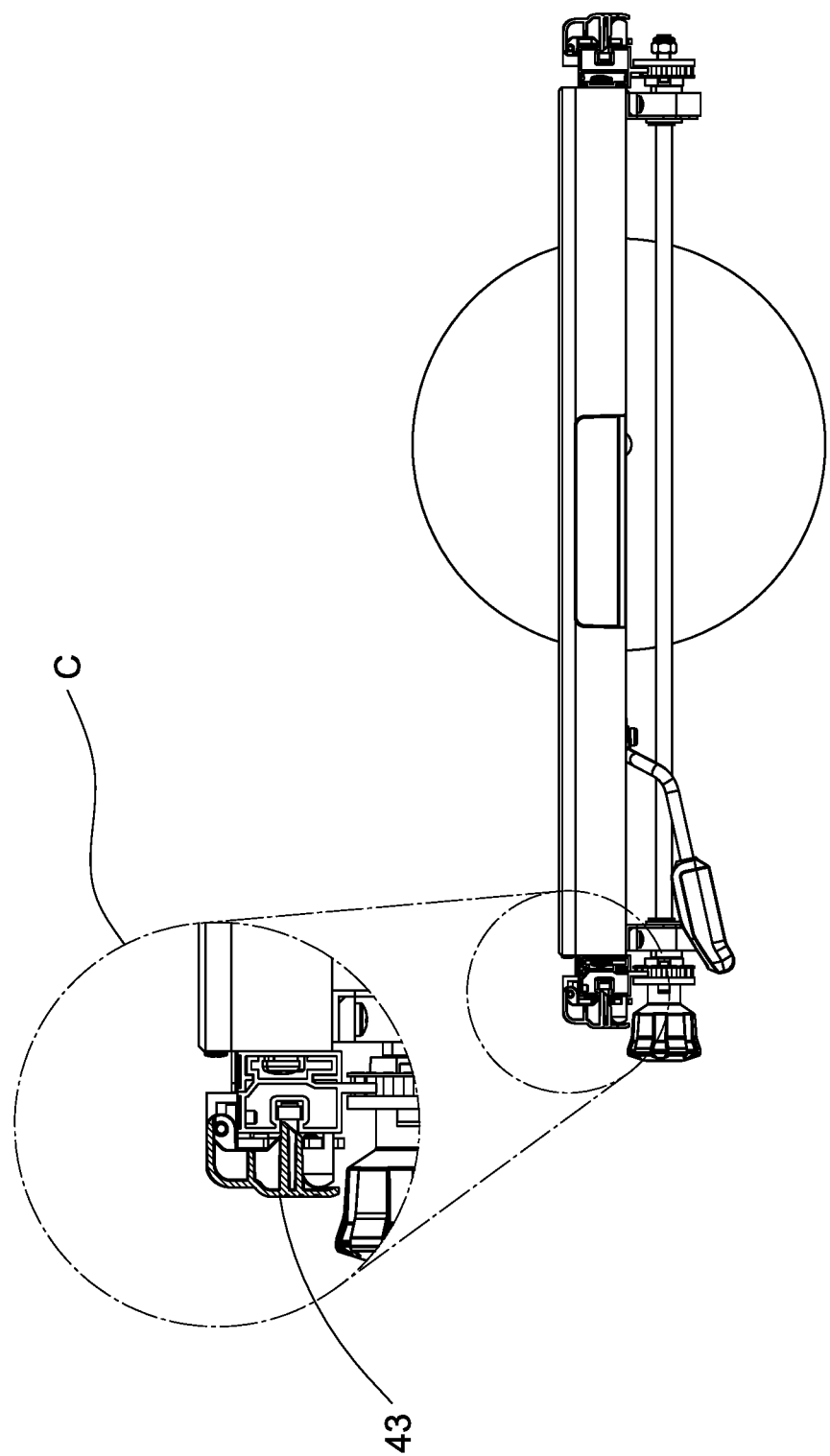
FIG. 16B is a left side view of FIG. 16A.
Figure 16C:
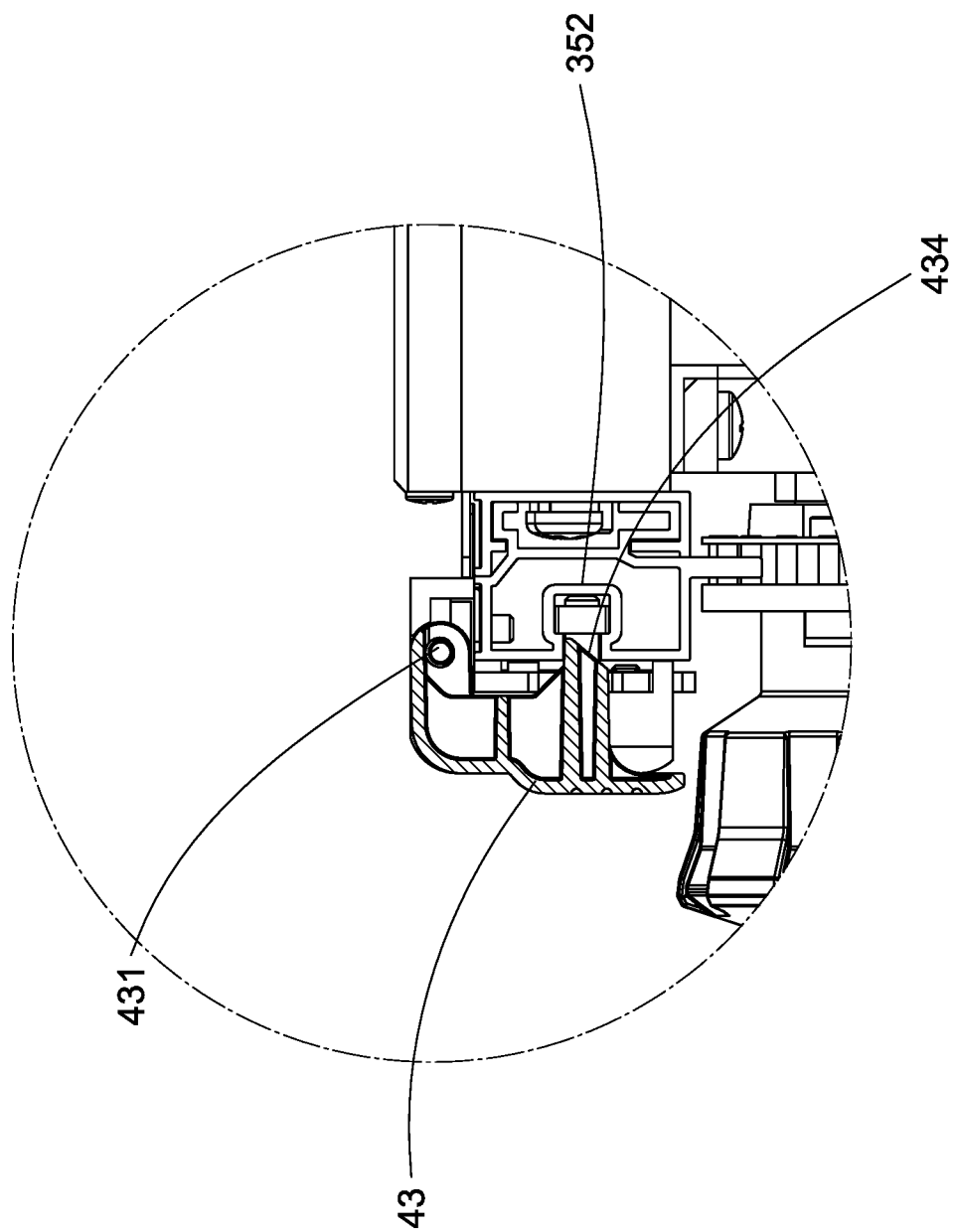
FIG. 16C is a detailed view of the area in a larger circle C of FIG. 16B.

Alternatively, the rip fence assembly 40 is mounted on the left side of the table assembly 20 (see FIG. 11) or a short distance from the right side of the table assembly 20 (see FIG. 12).

The table assembly 20 includes a table 21.

The rip fence assembly 40 includes front and rear arms 42 each having a cavity 421 at an open end; and a rip fence 41 between the arms 42, and front and rear risers 44 in which the front riser 44 is used to secure the front arm 42 and one end of the rip fence 41 together, and the rear riser 44 is used to secure the rear arm 42 and the other end of the rip fence 41 together.

The slide mechanism 30 includes a knob 31, front and rear roller pinions 32 each adjacent to the knob 31, an axle 33 mounted under the table 21 and having two ends attached to the roller pinions 32 respectively so that the knob 31, the roller pinions 32 and the axle 33 may co-rotate. The slide mechanism 30 further comprises front and rear mounting members 34 secured to the bottom of the table 21 and being adjacent to the roller pinions 32. The axle 33 rotatably passes through the front and rear mounting members 34.

The slide mechanism 30 further comprises two slides 35 slidably secured to front and rear ends of the table 21 respectively, each slide 35 having a rack 351 on a bottom, the rack 351 engaging teeth of the corresponding roller pinion 32, a lengthwise groove 352 on an outer surface, and a plurality of projections 353 projecting out of the groove 352 for releasably inserting into the cavity 421.

Figure 5A:
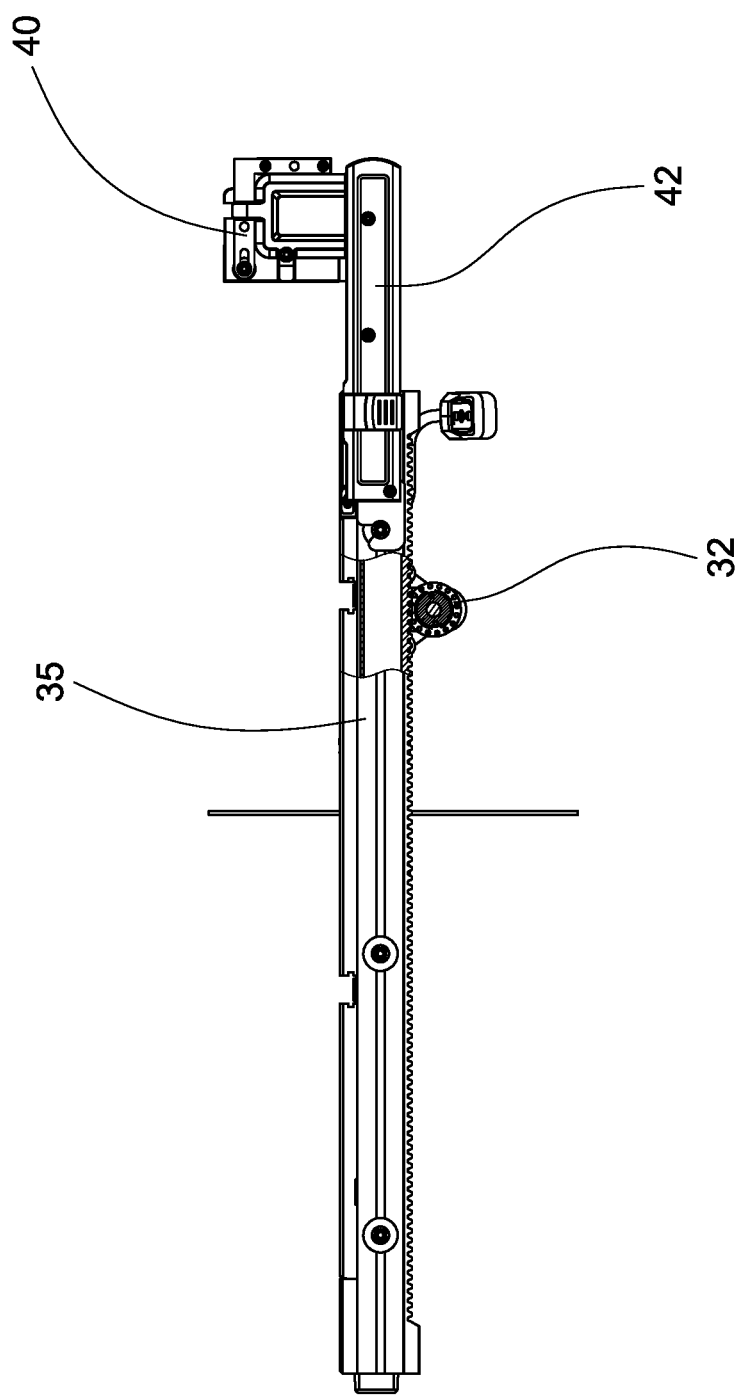
FIG. 5A is a plan view of FIG. 2.
Figure 5B:
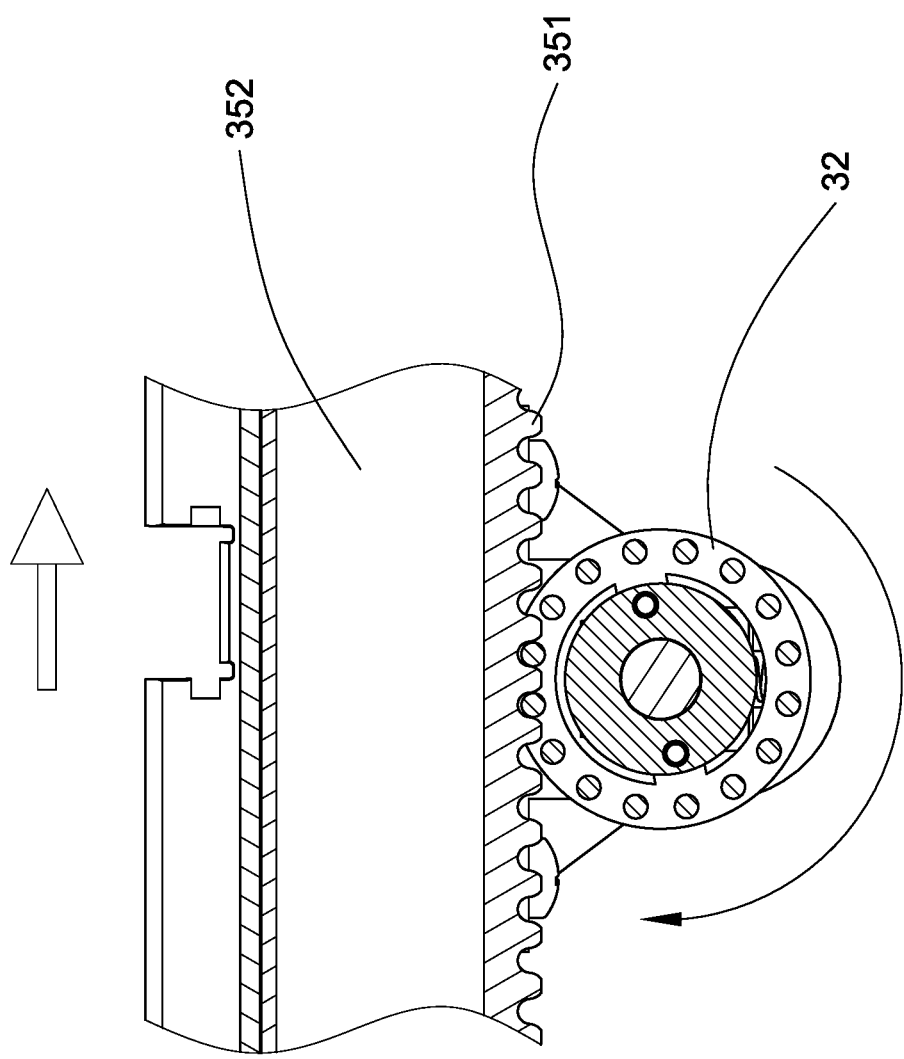
FIG. 5B is a detailed view of the area in a circle of FIG. 5A.
Figure 6:
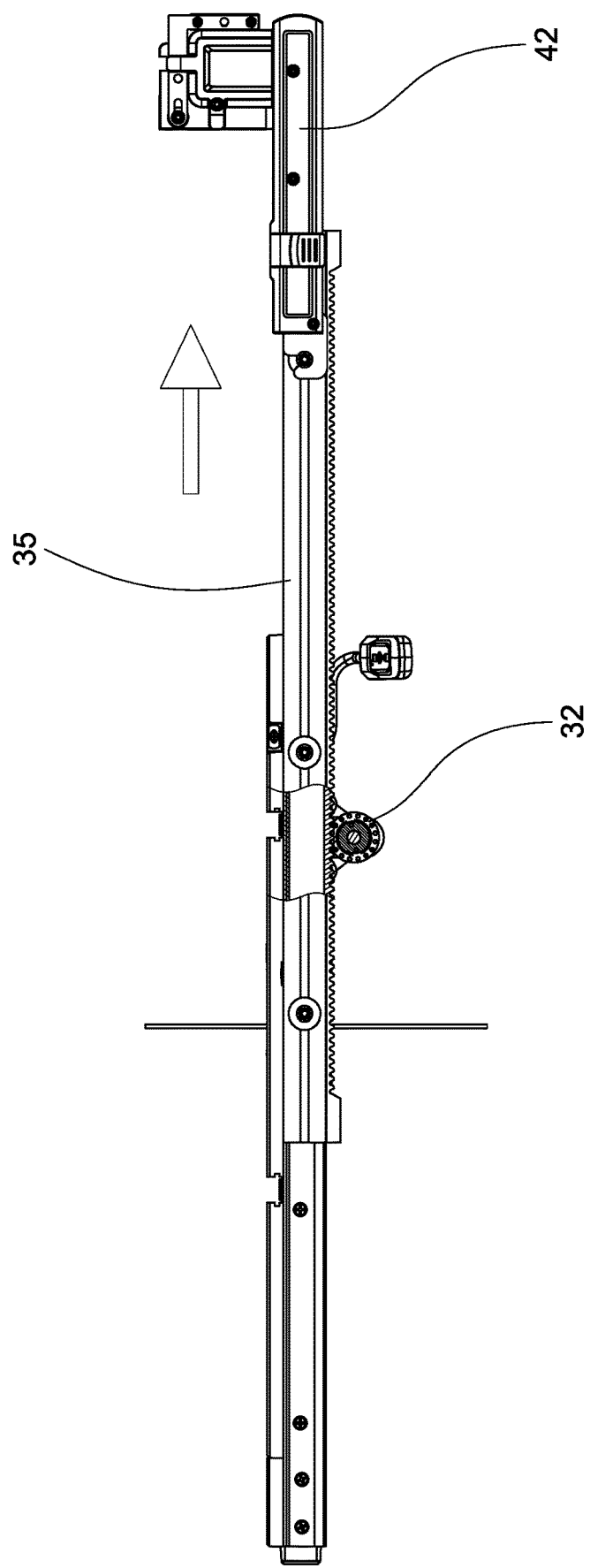
FIG. 6 is a view similar to FIG. 5A showing a rightward movement of the table assembly.
Figure 7:
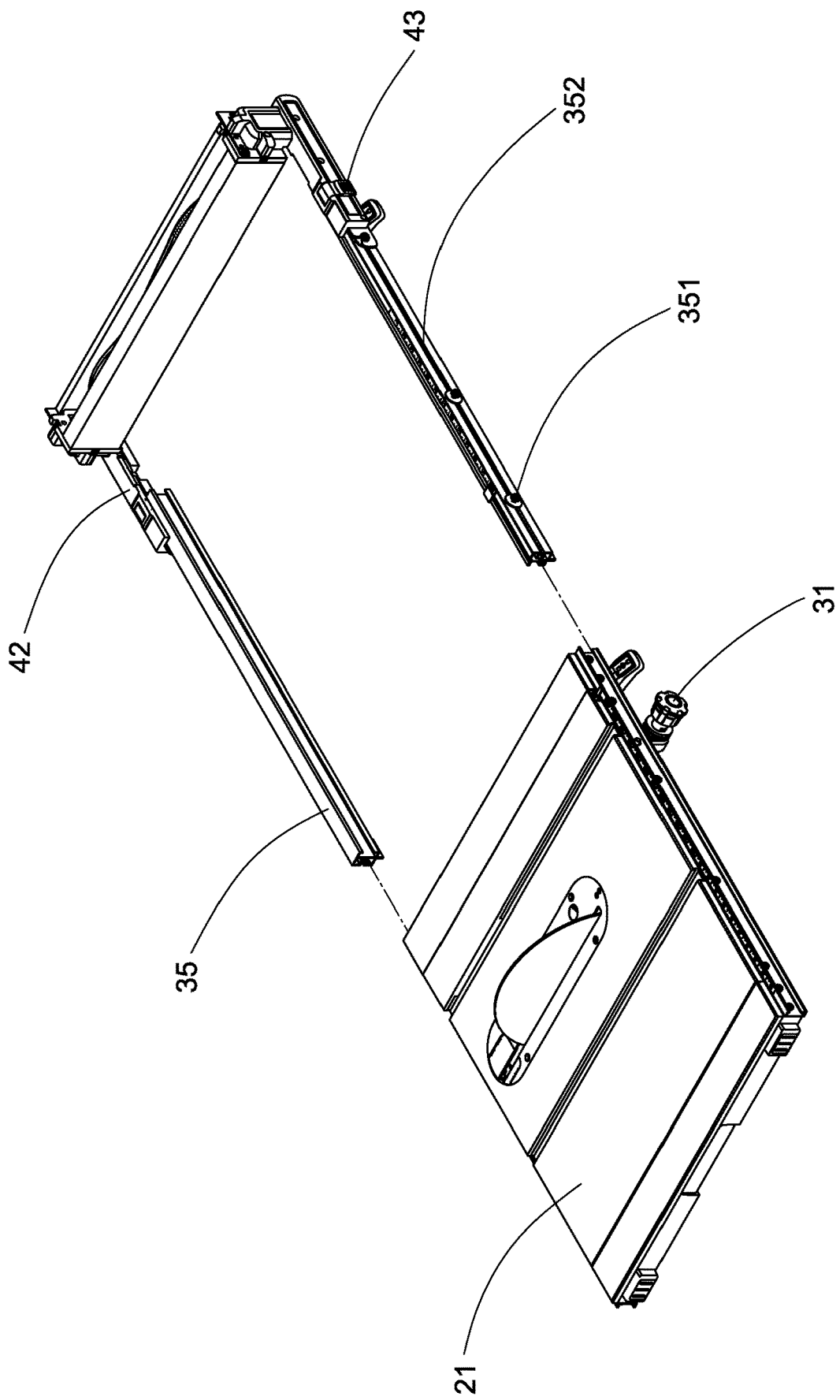
FIG. 7 is an exploded view of FIG. 2.
Figure 8:
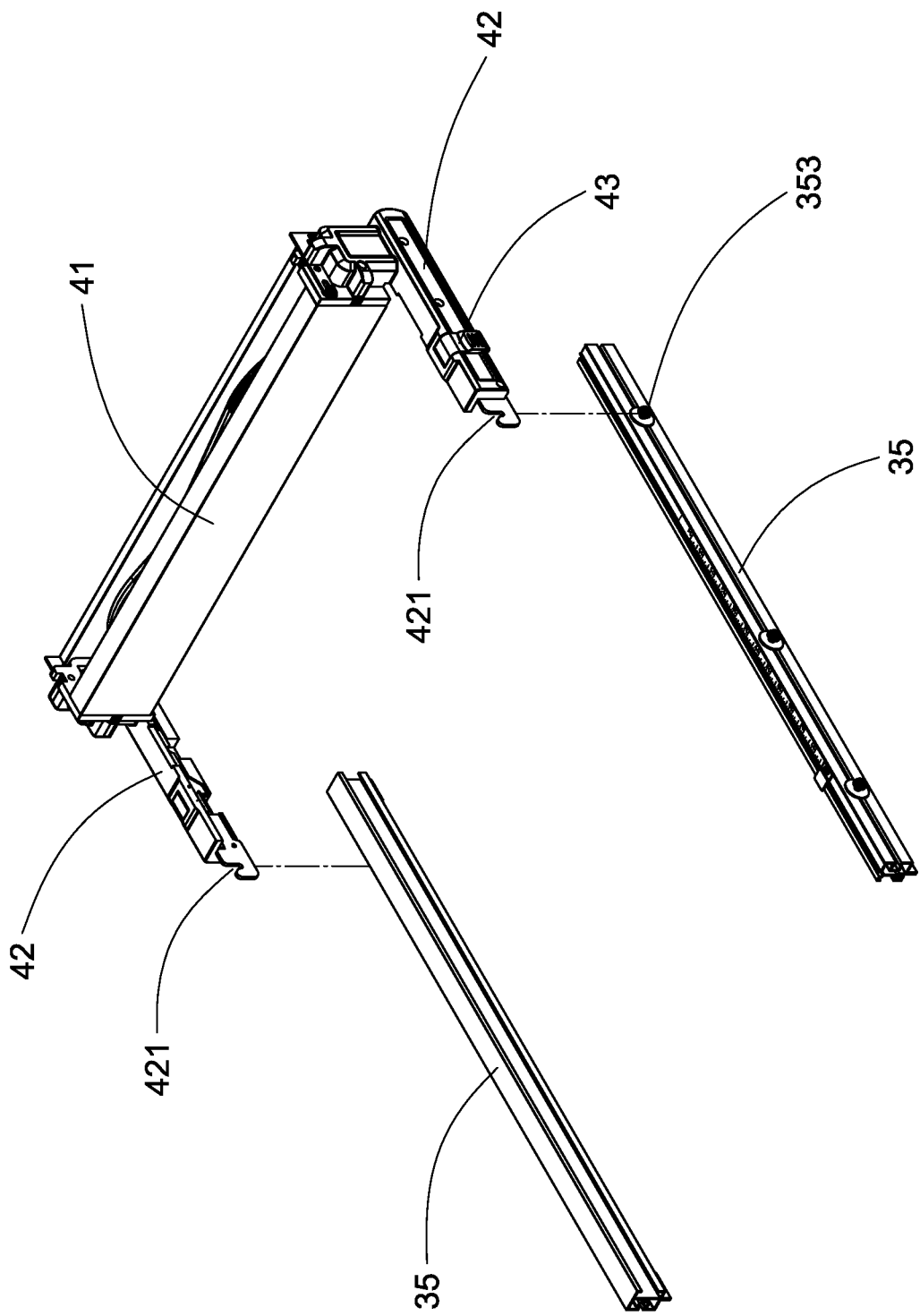
FIG. 8 is an exploded view of the rip fence assembly.
Figure 9:
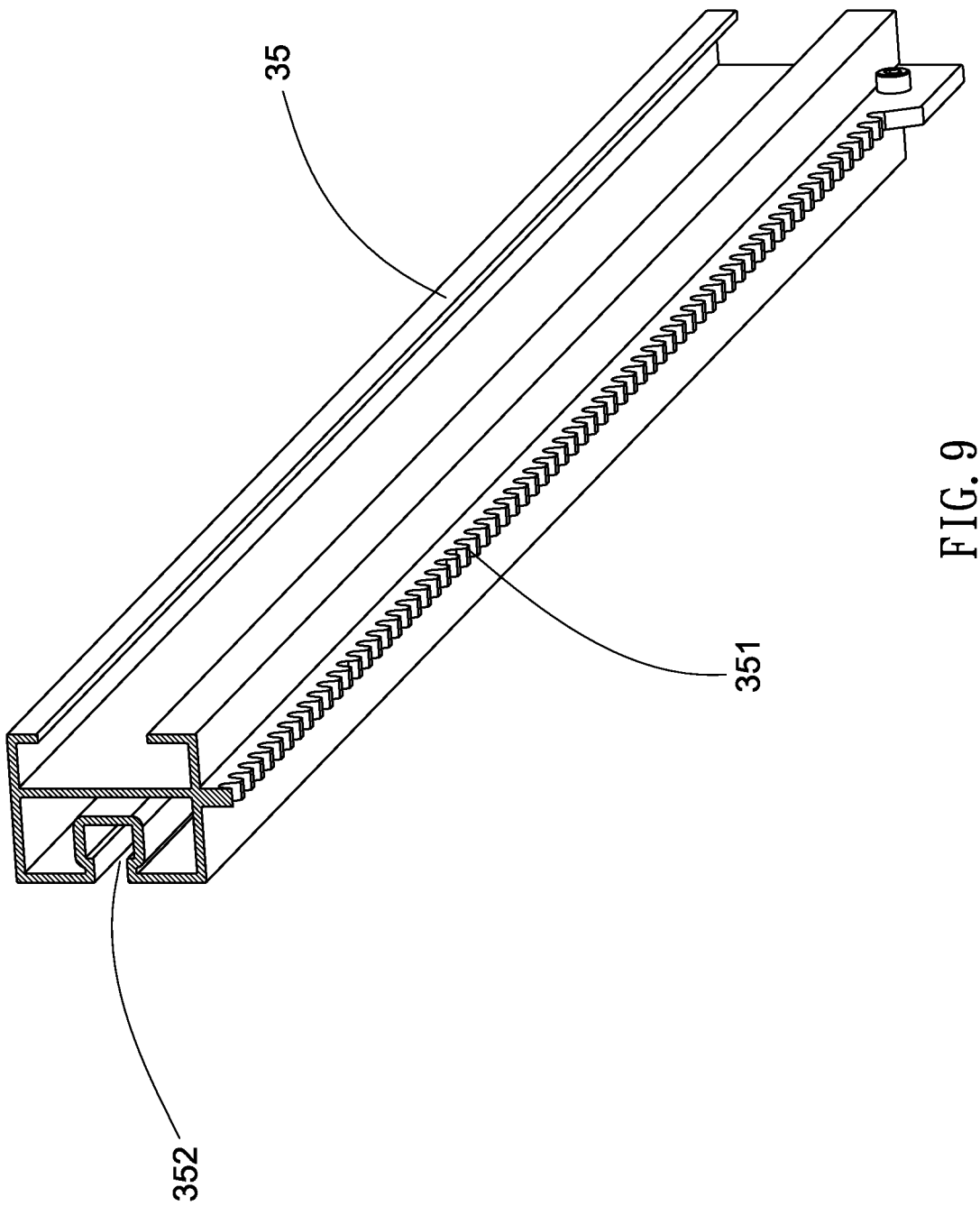
FIG. 9 is a greatly enlarged perspective view of the slide of FIG. 8.
Figure 10:
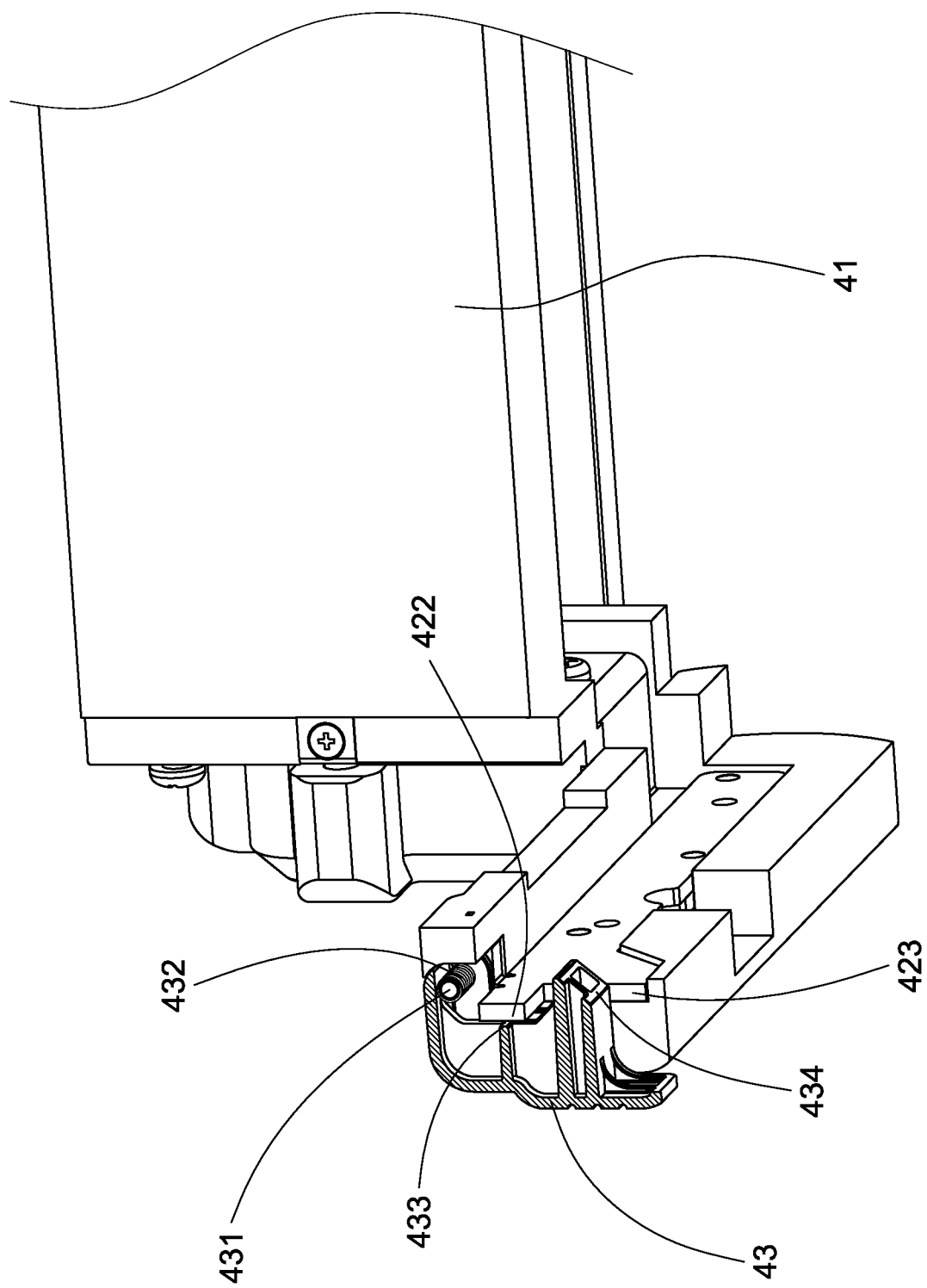
FIG. 10 is a greatly enlarged fragmentary view of the rip fence assembly.
Figure 11:
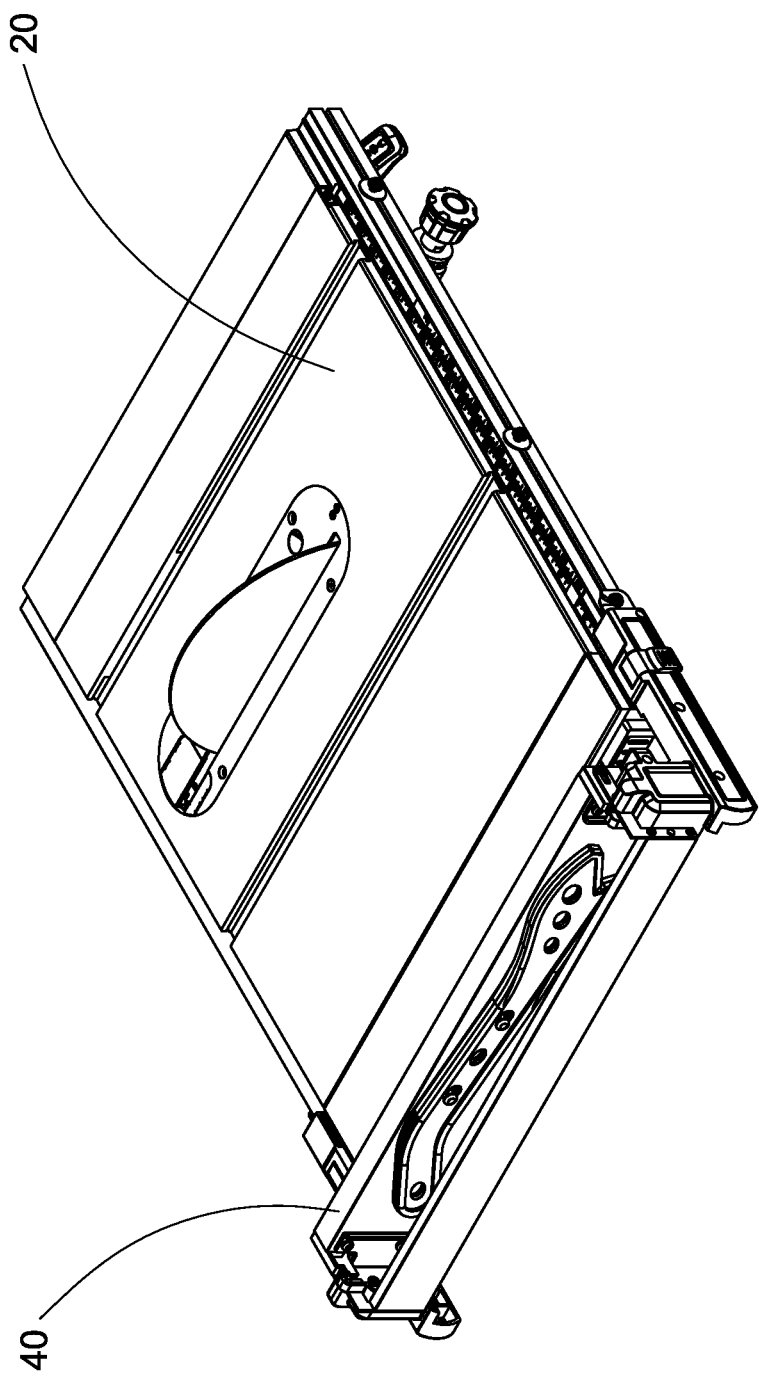
FIG. 11 is a perspective view of the table assembly, the rip fence assembly and the slide mechanism where the rip fence assembly is located at the left side.

As shown in FIG. 5B specifically, a clockwise rotation of the knob 31 clockwise values the roller pinions 32. And in turn, the racks 351 move rightward. As a result, both the slides 35 and the arms 42 move rightward. To the contrary, a counterclockwise rotation of the knob 31 counterclockwise rotates the roller pinions 32. And in turn, the racks 351 move leftward. As a result, both the slides 35 and the arms 42 move leftward.

Two levers 43 are provided on the arms 42 respectively. The lever 43 is adjacent to the cavity 352. The lever 43 includes a pivot 431 at an inner, upper end, and a torsion spring 432 put on the pivot 431 and secured to both the lever 43 and the arm 42 so that the lever 43 may pivot about the pivot 431, i.e., the lever 43 being pivotably secured to the arm 42. The lever 43 further comprises an inner, intermediate urging protuberance 433 and an inner protrusion 434 under the urging protuberance 433.

In a locking operation, an employee may pivot the lever 43 downward to urge the urging protuberance 433 against a resisting surface 422 of the arm 42 and insert the protrusion 434 into an opening 423 of the arm 42 to urge against the slide 35. As a result, both the arm 42 and the slide 35 are locked by the lever 43.

To the contrary, in an unlocking operation, an employee may pivot the lever 43 upward to disengage the urging protuberance 433 from the resisting surface 422 of the arm 42 and disengage the protrusion 434 from the opening 423 of the arm 42. As a result, both the arm 42 and the slide 35 are unlocked by the lever 43 and thus the slide 35 is allowed to slide.

Operation of securing the rip fence assembly 40 to the slide 35 (i.e., the slide mechanism 30 and the table assembly 20) is discussed in FIGS. 13, 14A, 14B, 14C, 15A, 15B, 15C, 16A, 16B and 16C.

Figure 17:
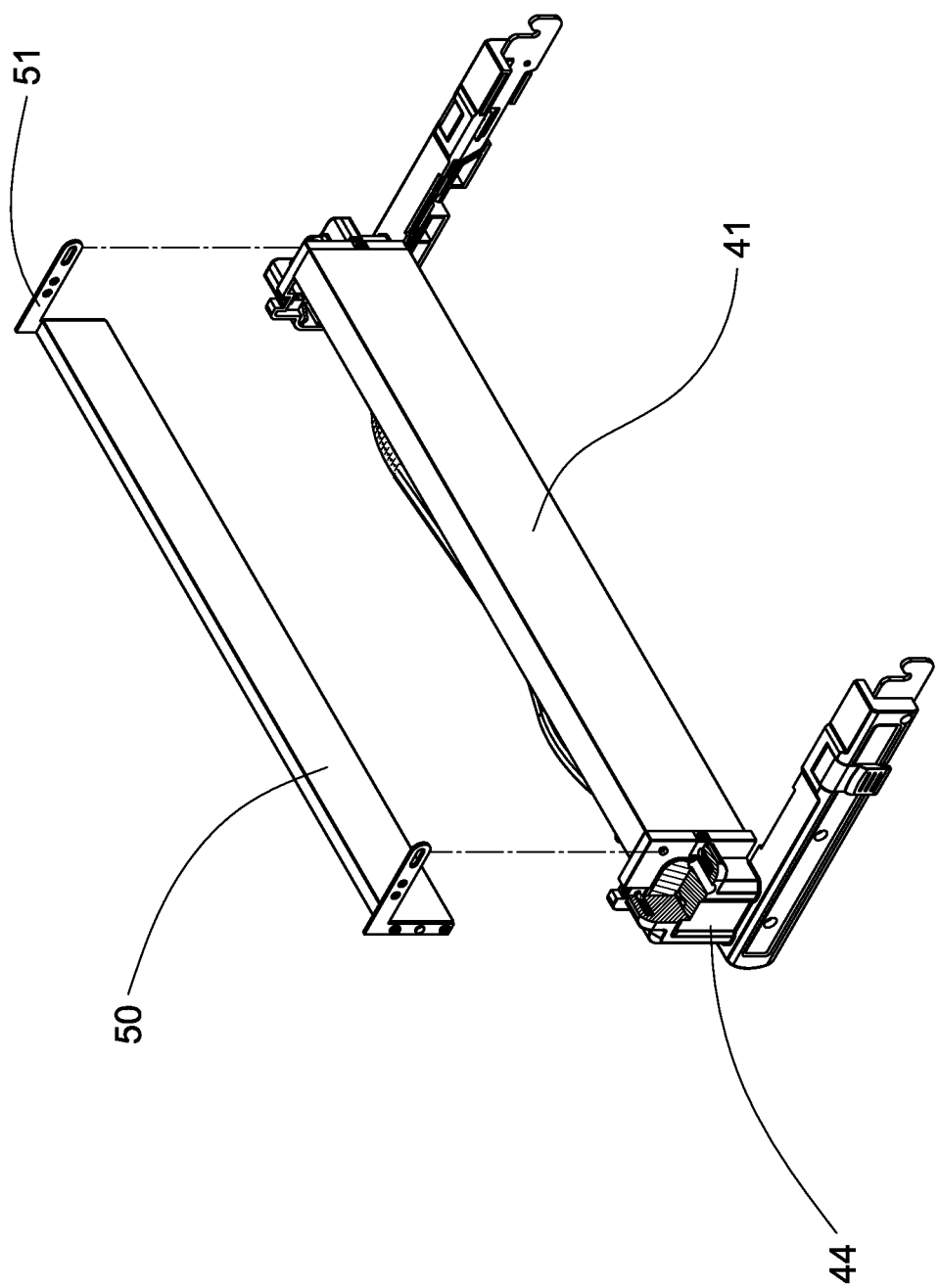
FIG. 17 is an exploded, perspective view of the rip fence assembly showing the metal plate in a non-use state.
Figure 18A:
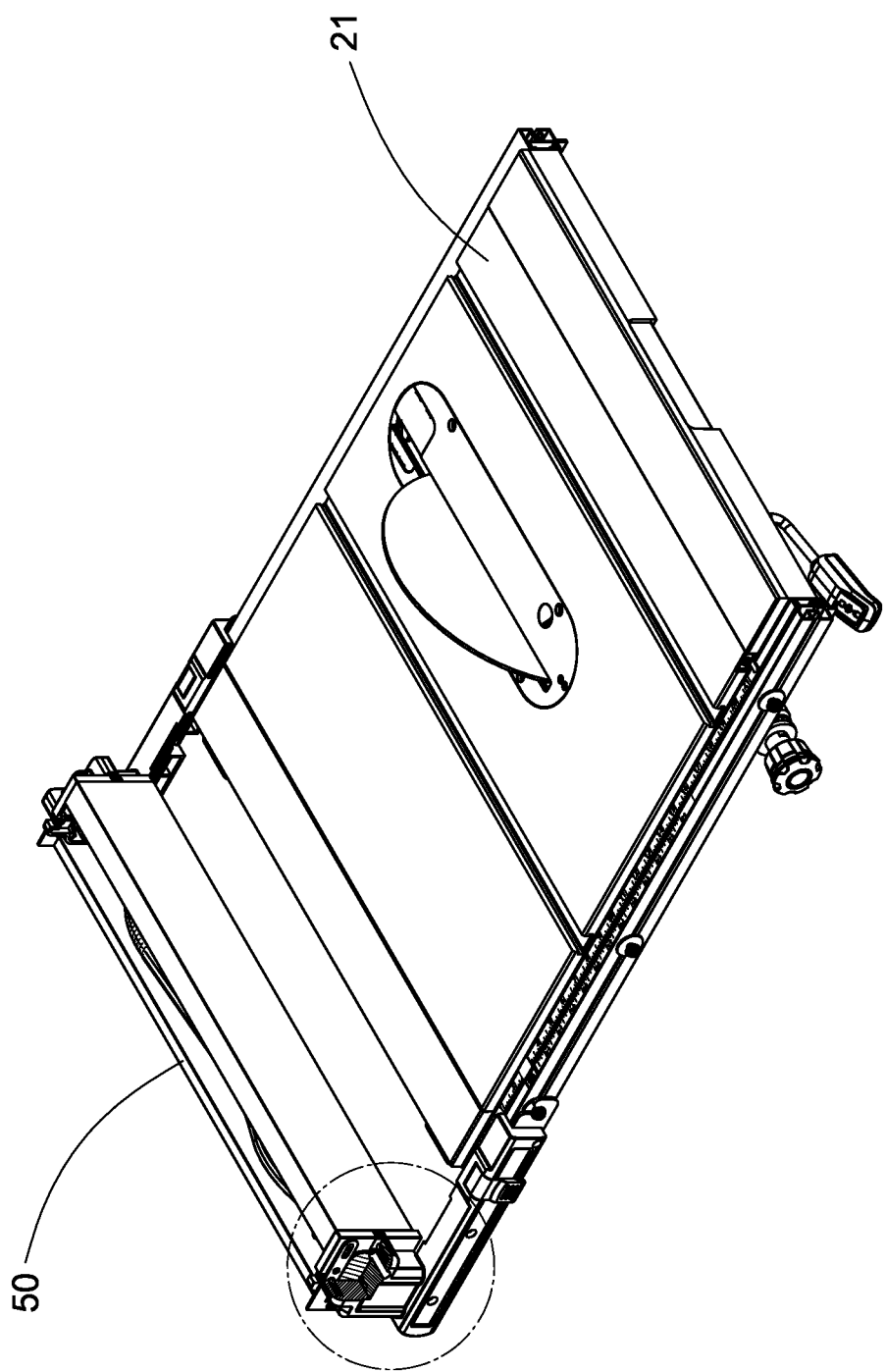
FIG. 18A is a perspective view of the table assembly, the rip fence assembly and the slide mechanism with a portion of the rip fence assembly shown in section.
Figure 18B:
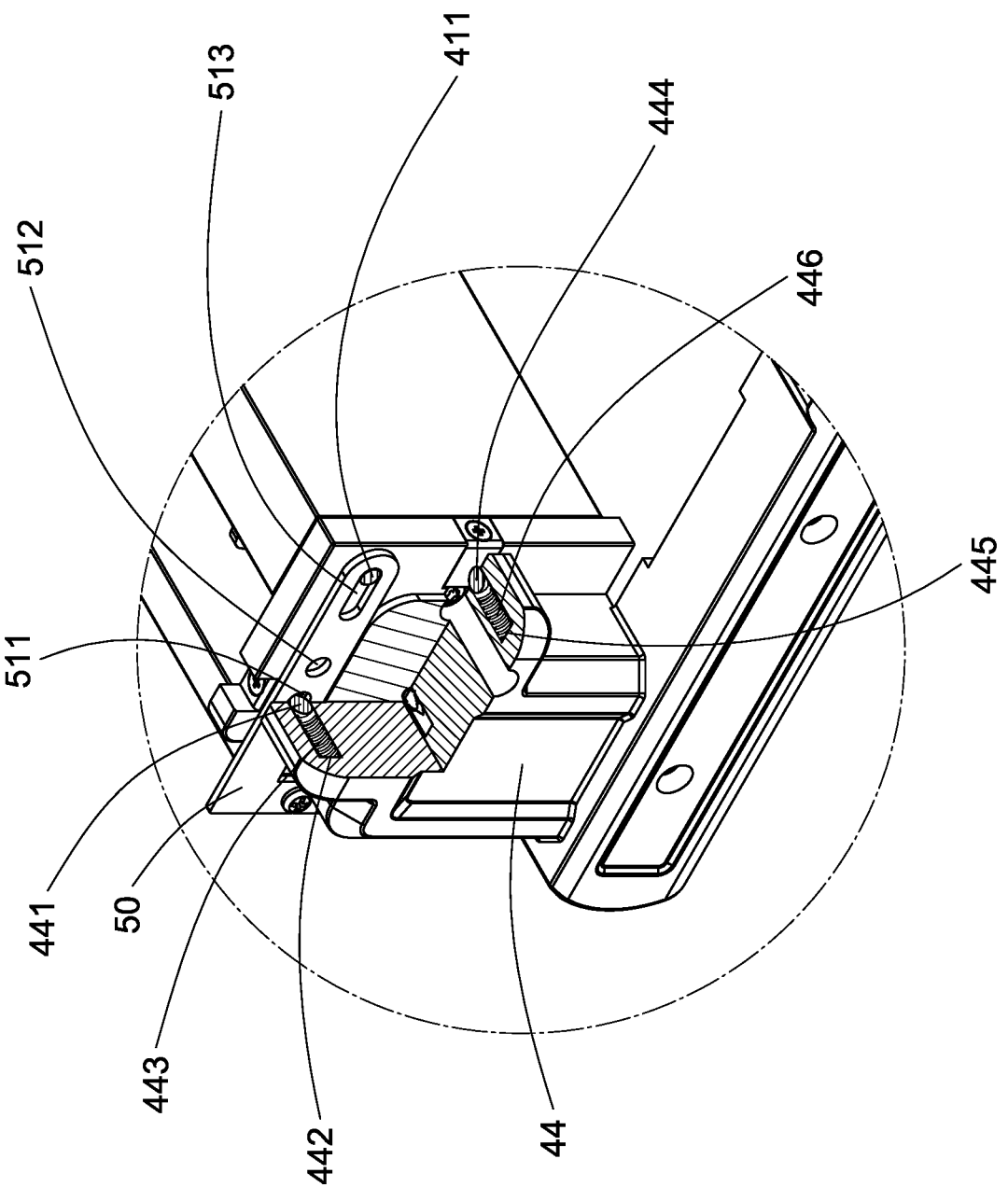
FIG. 18B is a detailed view of the area in a circle of FIG. 18A.
Figure 19:
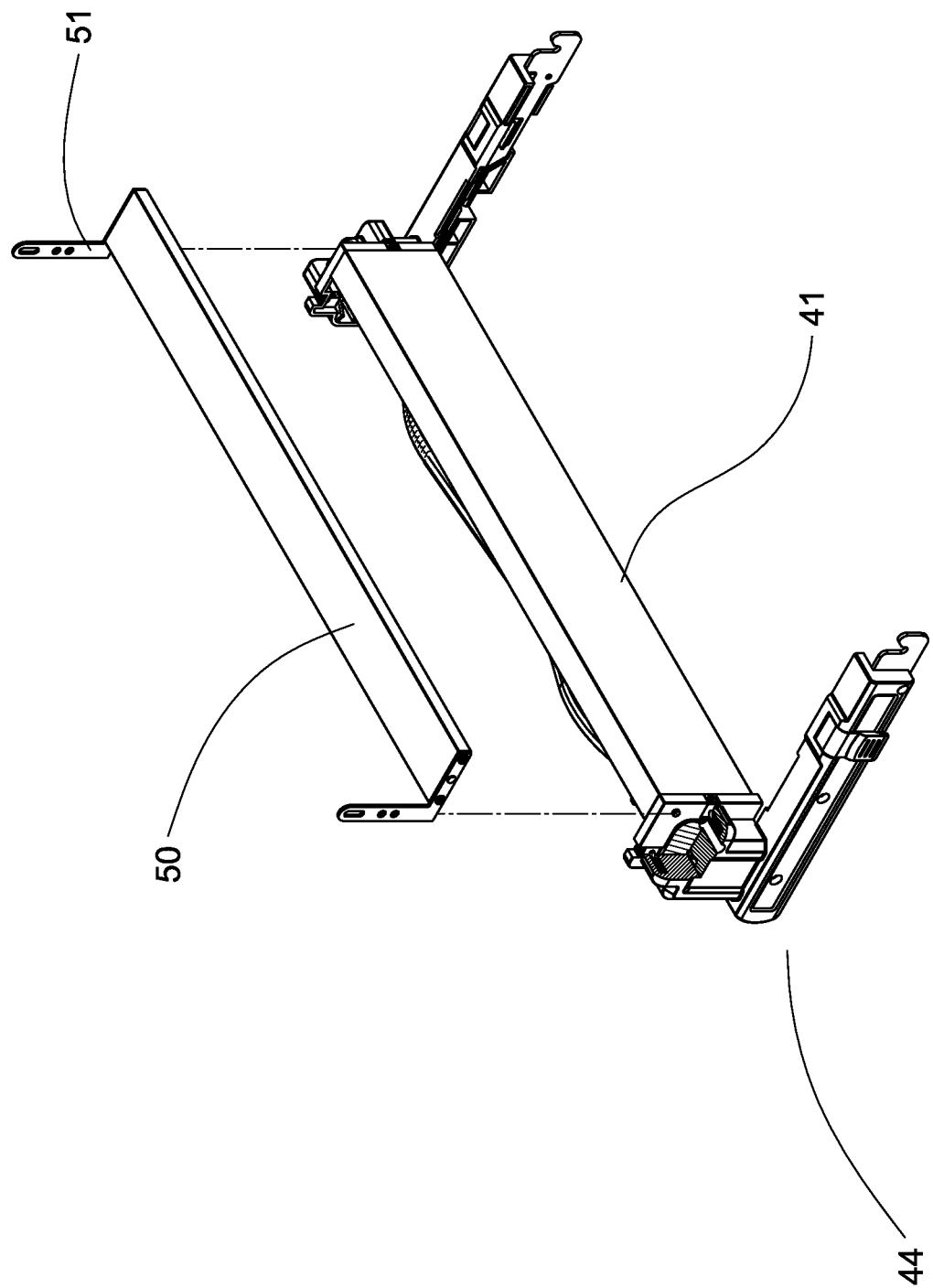
FIG. 19 is a view similar to FIG. 17, showing the metal plate in a use state.
Figure 20A:
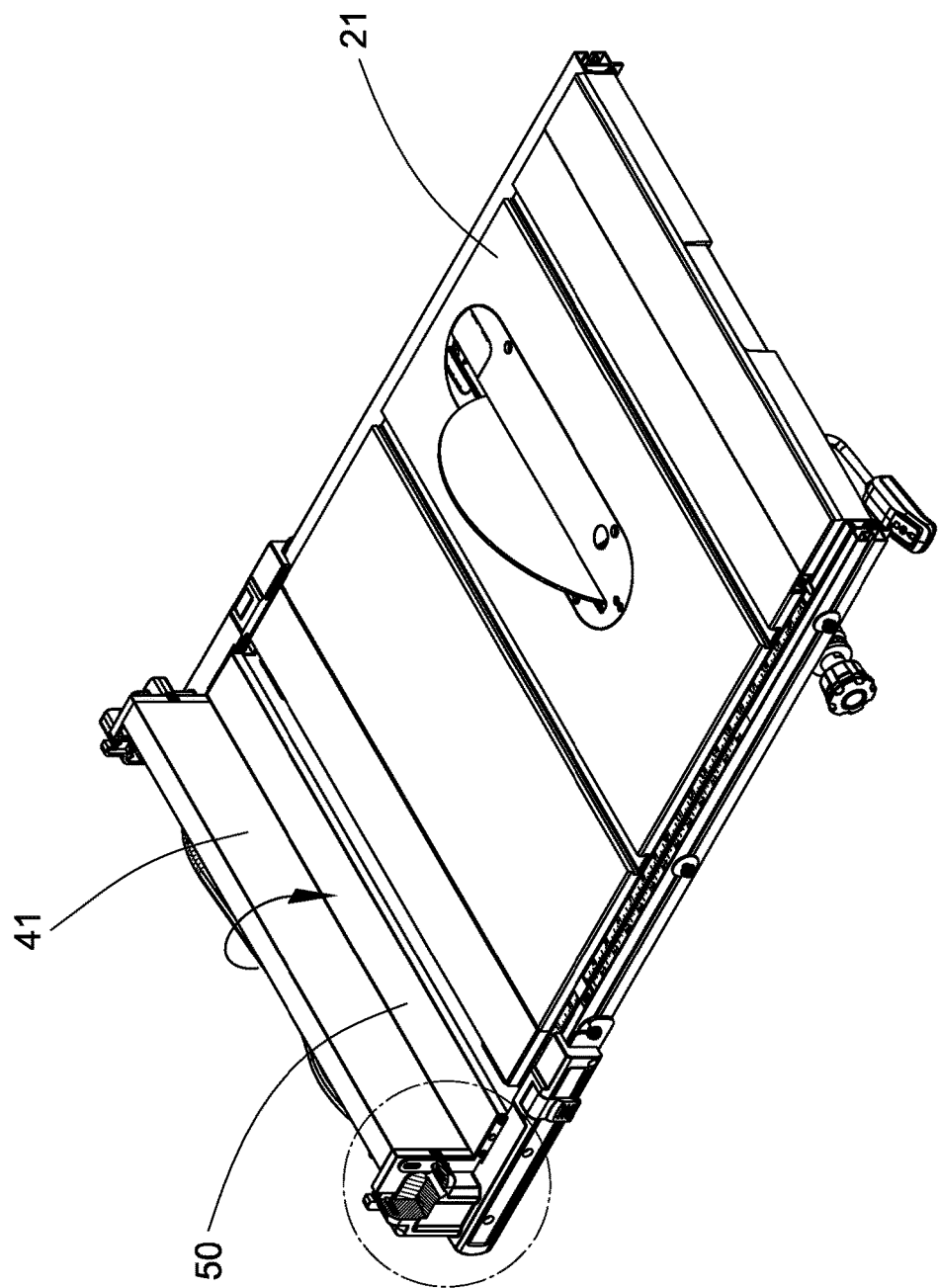
FIG. 20A is a perspective view of the table assembly, the rip fence assembly and the slide mechanism where the rip fence assembly is located at the left side.
Figure 20B:
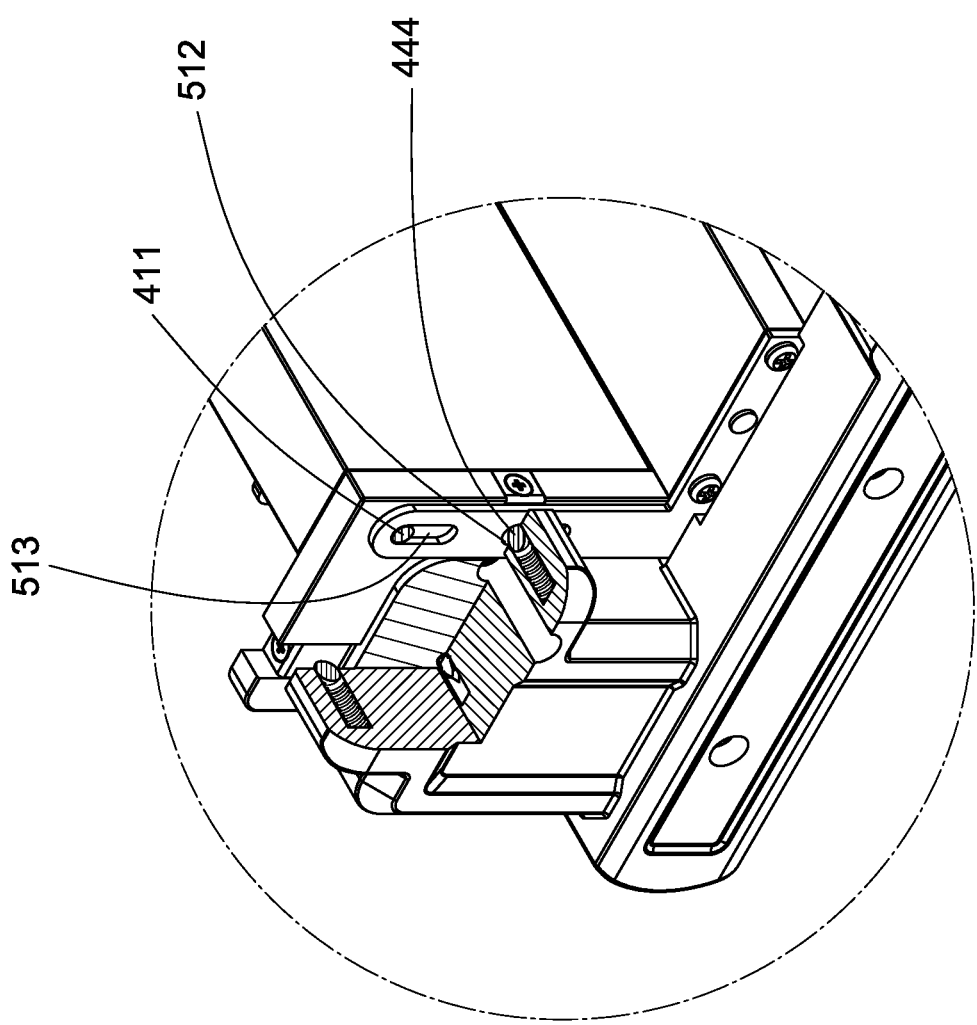
FIG. 20B is a detailed view of the area in a circle of FIG. 20A.

As shown in FIGS. 17 to 18B, a non-use state of an elongated, rectangular metal plate 50 is shown. The metal plate 50 includes two mounting elements 51 at two ends respectively. The mounting element 51 includes a first positioning hole 511, a second positioning hole 512 and an oval slot 513 at an open end and releasably put on a pivot 411 at either end of the rip fence 41. The riser 44 includes an upper positioning member (e.g., steel ball) 441 disposed at the mouth of a first hole 442, a first helical spring 443 anchored in the hole 442, a lower positioning member (e.g., steel ball) 444 disposed at the mouth of a second hole 445, and a second helical spring 446 anchored in the second hole 445. Thus, in the non-use state of the metal plate 50, the spring biased upper positioning member 441 is inserted into the first positioning hole 511, and the pivot 411 is at one end of the slot 513.

As shown in FIGS. 19 to 21B, a use state of the metal plate 50 is shown. As shown in FIGS. 20A and 20B specifically, the metal plate 50 is flush with the table 21, the spring biased lower positioning member 444 is inserted into the second positioning hole 512, and the pivot 411 is at one end of the slot 513.

Figure 21A:
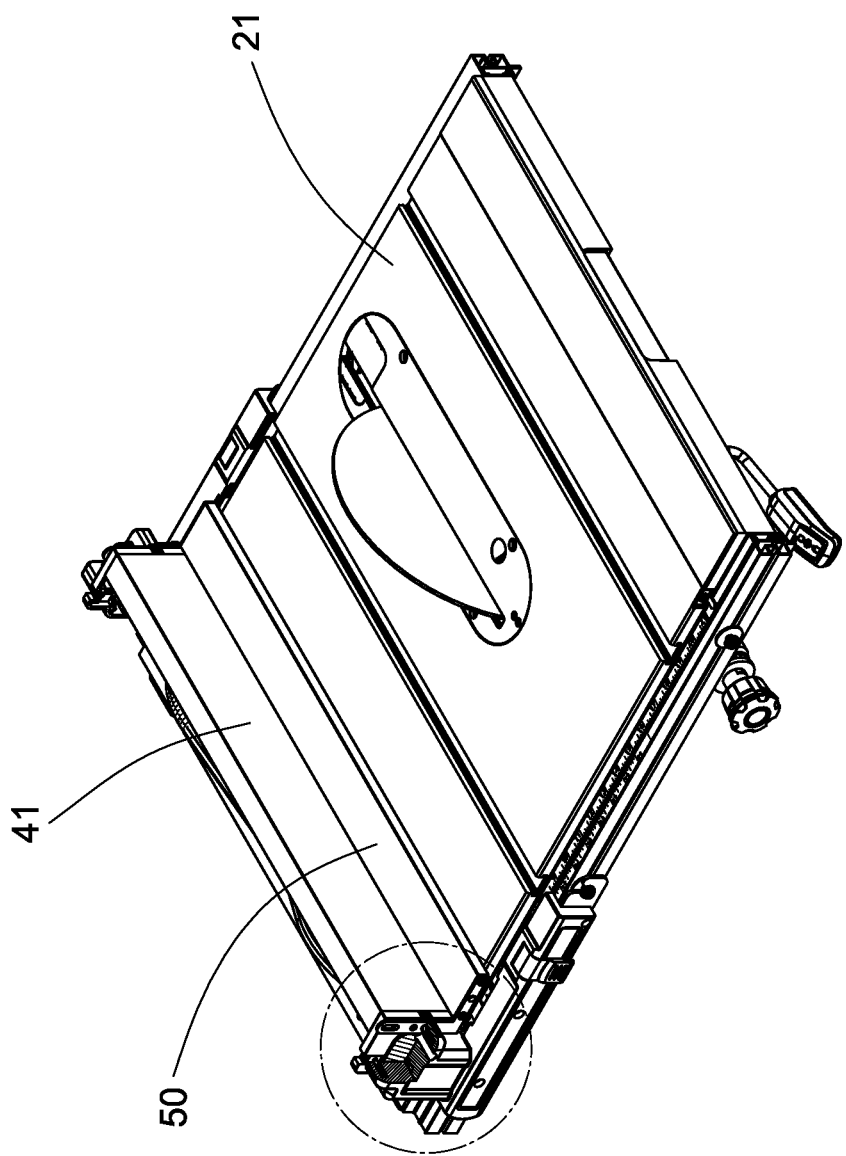
FIG. 21A is a view similar to FIG. 20A, showing the rip fence assembly being moved rightward a short distance.
Figure 21B:
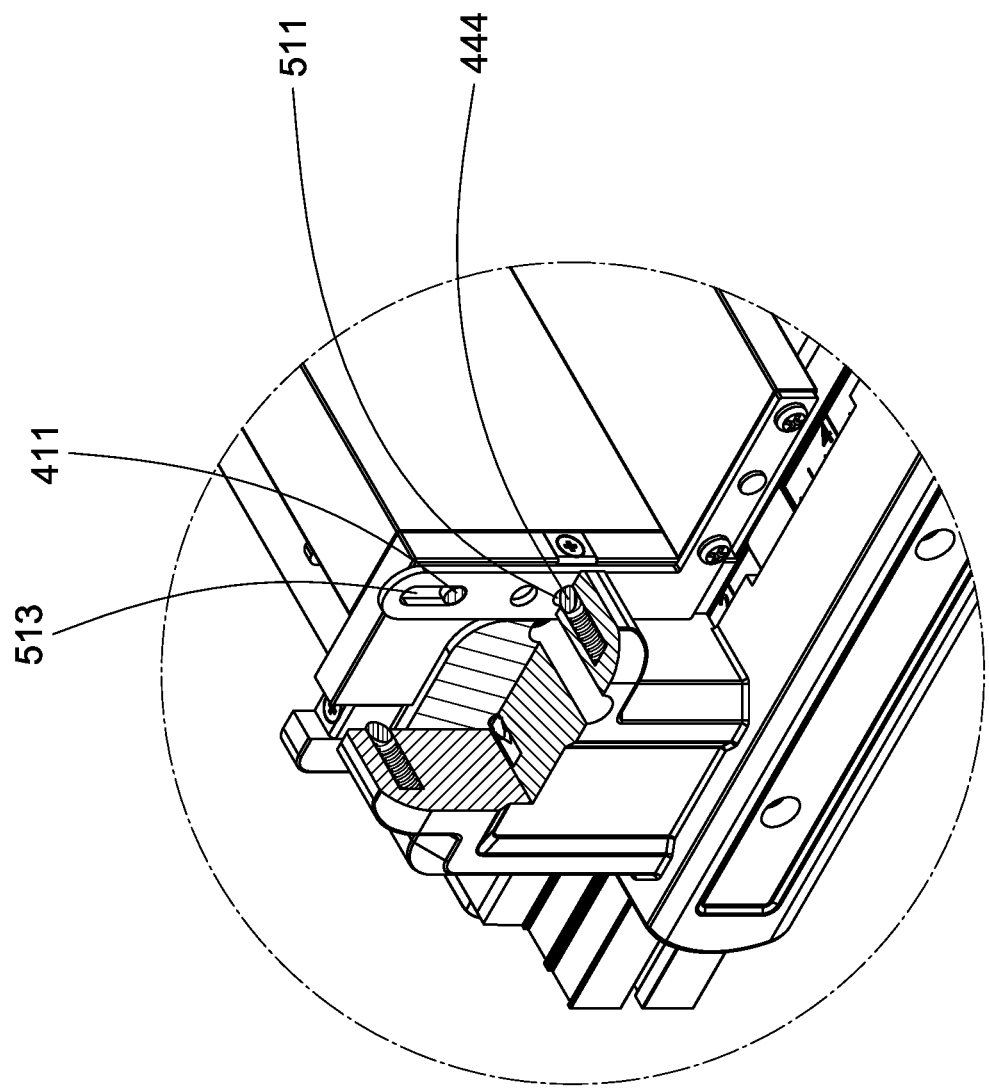
FIG. 21B is a detailed view of the area in a circle of FIG. 21A.

As shown in FIGS. 21A and 21B specifically, bottom of the metal plate 50 is flush with the table 21, the spring biased lower positioning member 444 is inserted into the first positioning hole 511, and the pivot 411 is at the other end of the slot 513.

Figure 22A:
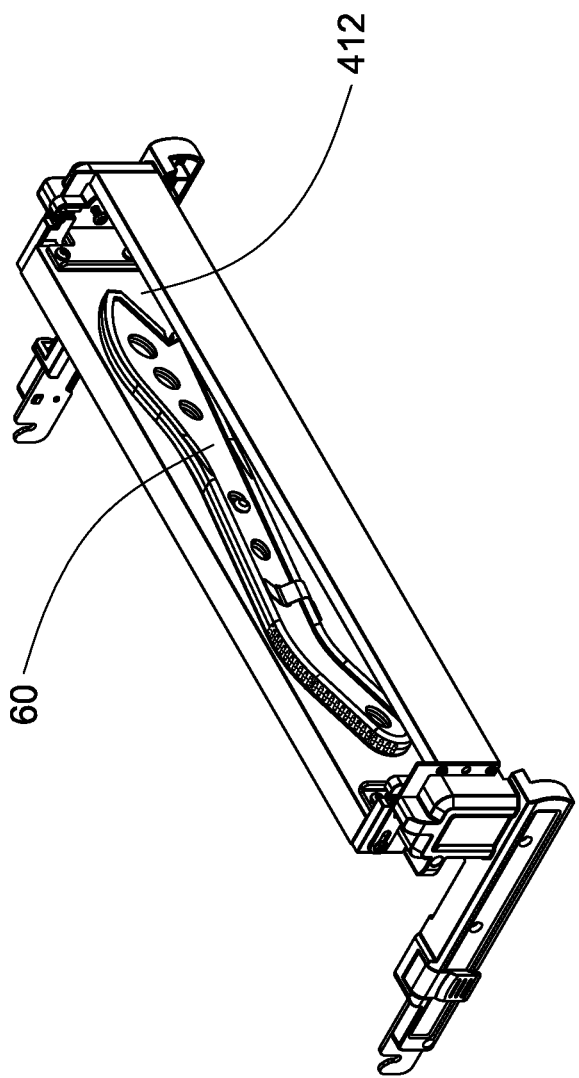
FIG. 22A is a perspective view of the rip fence assembly.
Figure 22B:
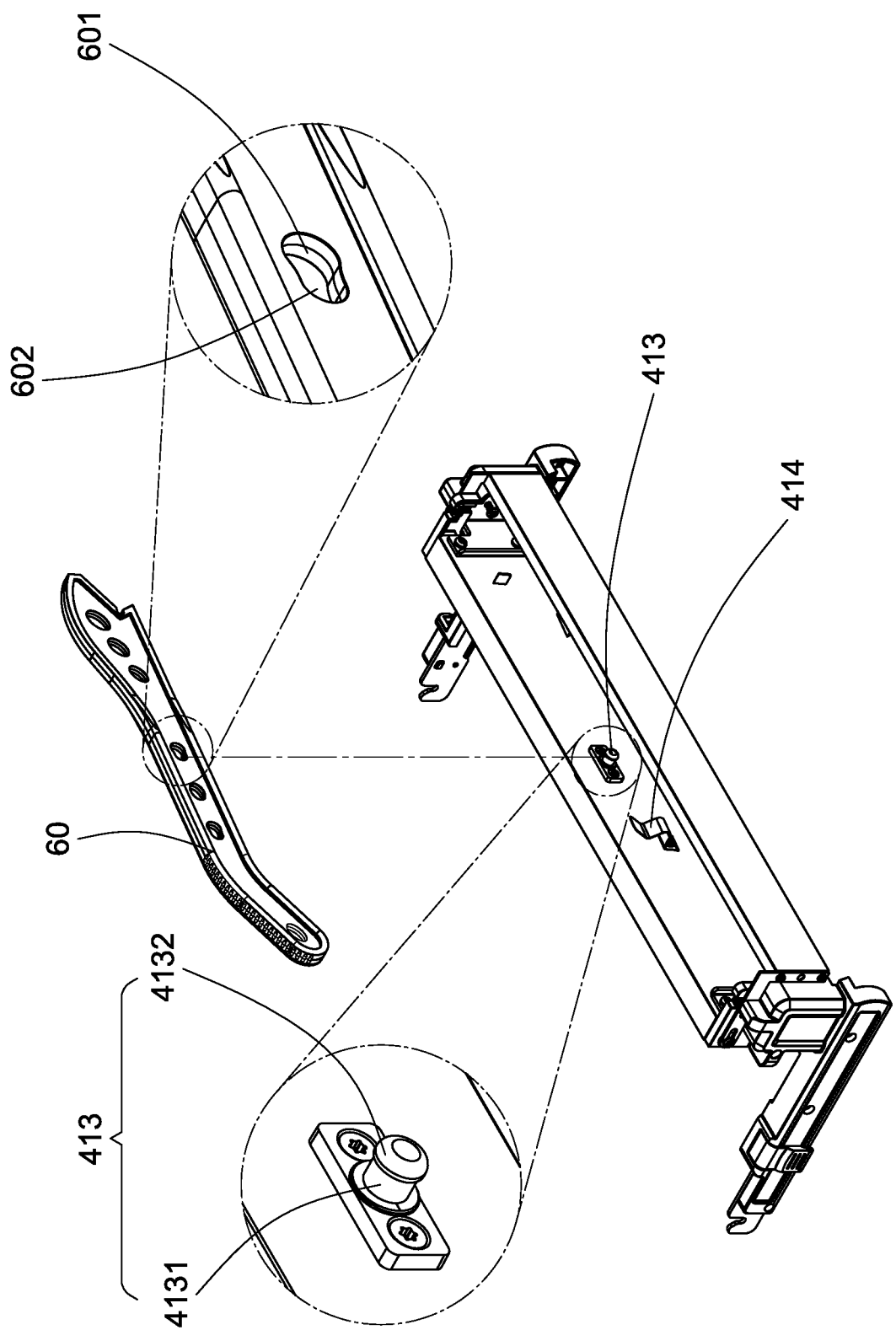
FIG. 22B is an exploded, perspective view of the rip fence assembly.

As shown in FIGS. 22A and 22B specifically, a tool 60 is received in a space 412 of the hollow rip fence 41. In detail, an anchor member 413 is secured to a wall of the space 412, the anchor member 413 including a shaft 4131 and an enlargement 4132 at an end of the shaft 4131; a clip 414 is also secured to the wall of the space 412, the clip 414 being configured to clamp the tool 60; and the tool 60 includes a plurality of sets of a larger hole 601 tightly put on the enlargement 4132, and a smaller hole 602 tightly put on the shaft 4131. As a result, the tool 60 is fastened in the rip fence 41.

While the invention has been described in terms of preferred embodiments, those skilled in the art will recognize that the invention can be practiced with modifications within the spirit and scope of the appended claims.

What is claimed is:

1. A table saw, comprising:

a base assembly;

a table assembly mounted on the base assembly and including a table;

a slide mechanism mounted on the table assembly and including a knob, front and rear roller pinions adjacent to the knob, front and rear mounting members secured to a bottom of the table and being adjacent to the front and rear roller pinions, two slides slidably secured to front and rear ends of the table respectively, each slide having a lengthwise groove on an outer surface, a bottom rack engaging either one of the front and rear roller pinions, and a plurality of projections projecting out of the lengthwise groove, and an axle mounted under the table and having two ends attached to the front and rear roller pinions respectively so that the axle is configured to rotatably pass through the front and rear mounting members;

a rip fence assembly mounted on either side of the table assembly and including front and rear arms each having a cavity at an open end configured to releasably secure to one of the projections, a rip fence disposed between the arms, front and rear risers respectively for fastening either end of the rip fence and either one of the front and rear arms, and two levers disposed on the arms respectively, each lever being adjacent to the cavity and including a spring biased pivot at an upper end, an intermediate urging protuberance, and a lower protrusion; and an elongated metal plate including two mounting elements at two ends respectively, the mounting element having a first positioning hole, a second positioning hole, and an oval slot at an open end, the slot being releasably put on a pivot member at either end of the rip fence;

wherein each of the front and rear risers includes a spring biased upper positioning member inserted into the first positioning hole in a non-use state of the metal plate, and a spring biased lower positioning member inserted into either the second positioning hole in a first use state of the metal plate or the first positioning hole in a second use state of the metal plate;

wherein the pivot member is at one end of the slot in the non-use state or the first use state of the metal plate; and wherein the pivot member is at the other end of the slot in the second use state of the metal plate.

* * * * *